US012657883B2

(12) United States Patent (10) Patent No.: US 12,657,883 B2
Minezawa (45) Date of Patent: Jun. 16, 2026

(54) TRAINING DEVICE AND TRAINING METHOD

(71) Applicant: Mitsubishi Electric Corporation, Tokyo (JP)

(72) Inventor: Akira Minezawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 334 days.

(21) Appl. No.: 18/385,625

(22) Filed: Oct. 31, 2023

(65) Prior Publication Data

US 2024/0062527 A1 Feb. 22, 2024

Related U.S. Application Data

(63) Continuation of application No. PCT/JP2021/018320, filed on May 14, 2021.

(51) Int. Cl.
*G06V 10/774* (2022.01)
*G01N 21/88* (2006.01)
(Continued)

(52) U.S. Cl.
CPC .......... *G06V 10/774* (2022.01); *G06V 10/762* (2022.01); *G06V 10/7715* (2022.01)

(58) Field of Classification Search
CPC .............. G06V 10/774; G06V 10/762; G06V 10/7715; G06V 10/77; G06V 10/87;
(Continued)

(56) References Cited

U.S. PATENT DOCUMENTS

| | | | |
|---|---|---|---|
| 12,400,135 B2 * | 8/2025 | Nagata | ...................... G06T 3/40 |
| 2016/0127405 A1 * | 5/2016 | Kasahara | ............... G06N 3/084 |
| | | | 726/23 |

(Continued)

FOREIGN PATENT DOCUMENTS

| | | |
|---|---|---|
| CN | 111178313 A | 5/2020 |
| CN | 111598808 A | 8/2020 |

(Continued)

OTHER PUBLICATIONS

Alexey Dosovitskiy et al., An Image is Worth 16×16 Words: Transformers for Image Recognition, Jun. 3, 2021, Google Research, Brain Team (Year: 2021).*

(Continued)

*Primary Examiner* — Chineyere Wills-Burns
*Assistant Examiner* — Lucius Cameron Gree Allen
(74) *Attorney, Agent, or Firm* — Birch, Stewart, Kolasch & Birch, LLP

(57) ABSTRACT

A training method, comprising: acquiring pieces of training image information each indicating a training image; generating one-dimensional training image signals respectively corresponding to the pieces of training image information by making the training image indicated by each of the pieces of training image information into one dimension; generating a matrix in which the one-dimensional training image signals are arranged in parallel with each other; calculating a right singular vector and a singular value by performing singular value decomposition on the matrix; generating a trained model that is based on the right singular vector and the singular value and outputs an inference result using, as an explanatory variable, a one-dimensional inference target image signal indicating an image obtained by making an inference target image that is an image obtained by image- (Continued)

capturing an inference target object into one dimension; and outputting the trained model as trained model information.

13 Claims, 11 Drawing Sheets

(51) Int. Cl.

| | | |
|---|---|---|
| *G06N 20/00* | (2019.01) |
| *G06T 7/00* | (2017.01) |
| *G06V 10/70* | (2022.01) |
| *G06V 10/762* | (2022.01) |
| *G06V 10/77* | (2022.01) |

(58) Field of Classification Search
CPC ......... G01N 21/88; G06T 7/00; G06T 7/0004;
G06N 20/00
USPC .......................................................... 382/159
See application file for complete search history.

(56) References Cited

U.S. PATENT DOCUMENTS

| | | | |
|---|---|---|---|
| 2020/0143605 A1 | 5/2020 | Kanishima et al. | |
| 2020/0320402 A1* | 10/2020 | Yoon | G06N 3/088 |
| 2021/0012001 A1* | 1/2021 | Nishino | G06F 21/554 |
| 2021/0312235 A1 | 10/2021 | Tsuchiya et al. | |
| 2022/0100814 A1* | 3/2022 | Zhang | G06T 1/20 |
| 2022/0261965 A1 | 8/2022 | Ji et al. | |

FOREIGN PATENT DOCUMENTS

| | | |
|---|---|---|
| JP | 2016-85704 A | 5/2016 |
| JP | 2020-77186 A | 5/2020 |
| JP | 2021-39757 A | 3/2021 |
| JP | 2021-42992 A | 3/2021 |
| WO | WO 2020/137229 A1 | 7/2020 |

OTHER PUBLICATIONS

Brand, "Fast Low-Rank Modifications of the Thin Singular Value Decomposition", Mitsubishi Electric Research Laboratories, Jul. 10, 2005, pp. 1-20.
International Search Report (PCT/ISA/210) issued in PCT/JP2021/018320, dated Jul. 6, 2021.
Kingma et al., "Auto-Encoding Variational Bayes", arXiv:1312.6114v10, May 1, 2014, pp. 1-14.
Rajwade et al., "Image Denoising using the Higher Order Singular Value Decomposition", IEEE Transactions on Pattern Analysis and Machine Intelligence, vol. 35 Issue 4, Apr. 2013, pp. 1-14.
Taiwanese Office Action issued in Taiwan Patent Application No. 110127678, dated May 1, 2023.
Office Action issued in Chinese Application No. 202180098003.1, dated Apr. 25, 2025, with English translation.
Chinese Office Action for Chinese Application No. 202180098003.1, dated Sep. 2, 2025, with English translation.
Indian Examination Report for Indian Application No. 202347076584, dated Apr. 16, 2025, with English translation.
European Communication pursuant to Article 94(3) EPC for European Application No. 21 941 948.8, dated Feb. 14, 2025.
Lu et al., "Defect inspection of patterned thin film transistor-liquid crystal display panels using a fast sub-image-based singular value decomposition," International Journal of Production Research, vol. 42, No. 20, XP093248265, dated Oct. 15, 2004, pp. 4331-4351.
Brunton et al., "Singular Value Decomposition from Data Driven Science & Engineering, Machine Learning, Dynamical Systems, and Control," Cambridge University Press, 2019, pp. 1-53 (90 pages total).
Drineas et al., "Fast Monte Carlo Algorithms for Matrices II: Computing a low-rank Approximation to a Matrix," Society for Industrial and Applied Mathematics, vol. 36, No. 1, 2006, pp. 158-183.
Korean Office Action for Korean Application No. 10-2023-7037980, dated Mar. 4, 2024, with English translation.
Extended European Search Report for European Application No. 21941948.8, dated Jun. 10, 2024.
Gideon Kwadzo Gogovi, "Digital Image Processing Via Singular Value Decomposition," Kwame Nkrumah University of Science and Technology, May 1, 2013, pp. 1-95.
Chinese Office Action for Chinese Application No. 202180098003.1, dated Jan. 5, 2026, with English translation.

* cited by examiner

FIG. 3A

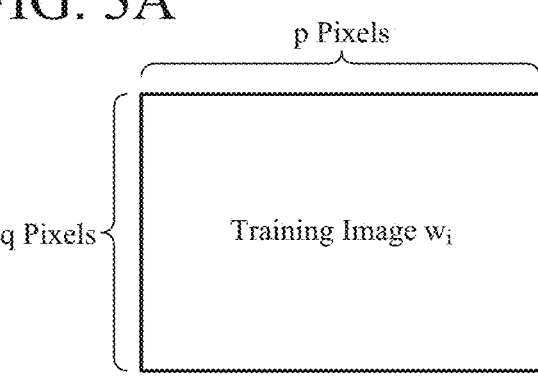

p Pixels q Pixels

Training Image $w_i$

FIG. 3B

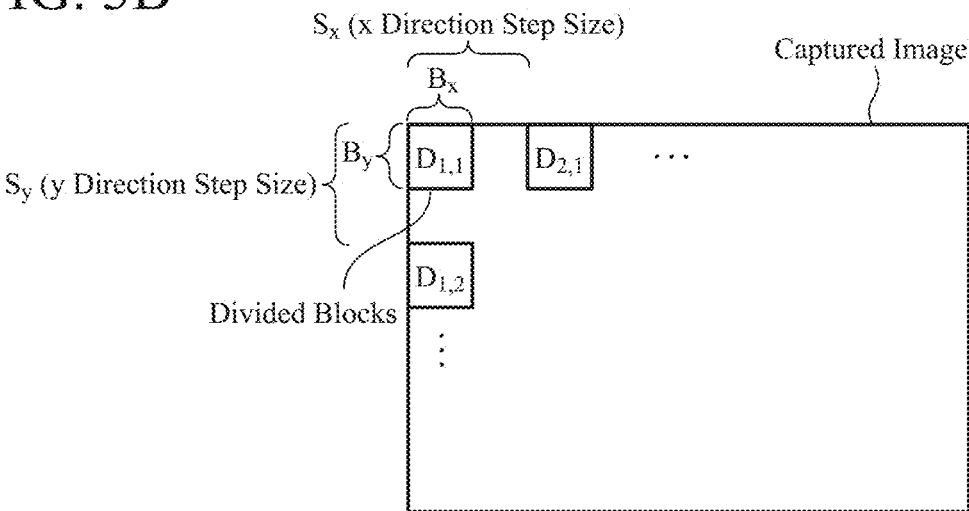

$S_x$ (x Direction Step Size)

$B_x$

Captured Image $S_y$ (y Direction Step Size)

$B_y$ $D_{1,1}$    $D_{2,1}$    $\cdots$ $D_{1,2}$

Divided Blocks

FIG. 3C

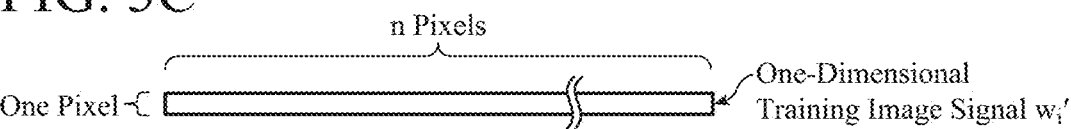

n Pixels

One Pixel

One-Dimensional
Training Image Signal $w_i'$

FIG. 3D

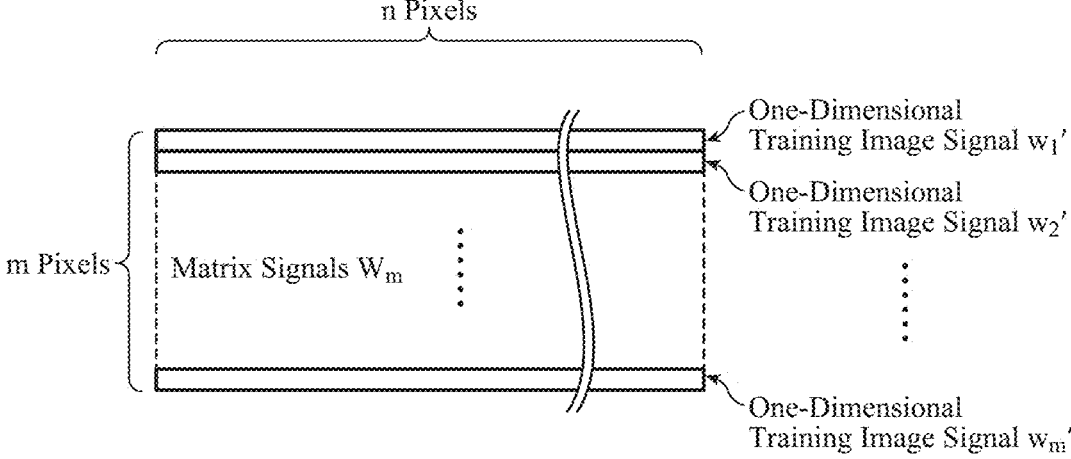

n Pixels m Pixels

Matrix Signals $W_m$

One-Dimensional
Training Image Signal $w_1'$

One-Dimensional
Training Image Signal $w_2'$

One-Dimensional
Training Image Signal $w_m'$

START

Acquire
Captured Inference Image Information — ST901

Acquire
Inference Target Image Information — ST902

Generate One-Dimensional Inference
Target Image Signal — ST903

Acquire Trained Model Information — ST904

Acquire Inference Result Information — ST905

END

TRAINING DEVICE AND TRAINING METHOD

CROSS REFERENCE TO RELATED APPLICATIONS

This application is a Continuation of PCT International Application No. PCT/JP2021/018320 filed on May 14, 2021, which is hereby expressly incorporated by reference into the present application.

TECHNICAL FIELD

The present disclosure relates to a training device and a training method.

BACKGROUND ART

Methods for training a training model to generate a trained model include supervised training and unsupervised training.

For example, Non Patent Literature 1 discloses a technique of generating a trained model by efficiently performing deep learning on a training model configured by a neural network by optimization using a stochastic gradient variational Bayesian.

CITATION LIST

Non Patent Literature

Non Patent Literature 1: "Diederik P Kingma, Max Welling", "Auto-Encoding Variational Bayes", [online], "arXiv:1312.6114v10", [Searched on Dec. 4, 2020], Internet (URL: https://arxiv.org/abs/1312.6114v10)

SUMMARY OF INVENTION

Technical Problem

In a case where the technology (hereinafter referred to as "conventional art") disclosed in Non Patent Literature 1 is applied to the field of image processing, a trained model that outputs a feature vector that is a latent variable in an image used for training (hereinafter referred to as a "training image") and a generated image decoded from this vector can be obtained as a learning result of deep learning, and compression, restoration, abnormality detection, classification, or the like of an image to be inferred (hereinafter referred to as an "inference target image") can be performed using the trained model.

However, in order to obtain a highly accurate feature vector in a training image and a generated image in the conventional art, it is necessary to construct a deep neural network in which intermediate layers in the neural network are multilayered, and perform deep learning of an enormous number of weights that requires iterative optimization processing using a large number of training images.

Therefore, since the amount of calculation is enormous in the conventional art, the conventional art has a problem that, in order to generate a trained model that enables highly accurate inference, it is necessary to cause the training model to learn for a long time.

The present disclosure is intended to solve the above-described problems, and an object thereof is to provide a training device capable of generating a trained model that enables highly accurate inference in a short time compared to the related art.

Solution to Problem

A training device according to the present disclosure includes processing circuitry to acquire a plurality of pieces of training image information each indicating a training image, to generate a plurality of one-dimensional training image signals respectively corresponding to the plurality of pieces of training image information by making the training image indicated by each of the plurality of pieces of training image information into one dimension, to generate a matrix in which the plurality of one-dimensional training image signals is arranged in parallel with each other, to calculate a right singular vector and a singular value by performing singular value decomposition on the matrix, to generate a trained model that is based on the right singular vector and the singular value and outputs an inference result using, as an explanatory variable, a one-dimensional inference target image signal indicating an image obtained by making an inference target image that is an image obtained by image-capturing an inference target object into one dimension, and to output the trained model as trained model information.

Advantageous Effects of Invention

According to the present disclosure, it is possible to generate a trained model that enables highly accurate inference in a short time compared to the related art.

BRIEF DESCRIPTION OF DRAWINGS

FIG. 3A is an explanatory diagram schematically illustrating a training image according to the first embodiment. FIG. 3B is an explanatory diagram schematically illustrating a modification of the training image according to the first embodiment. FIG. 3C is an explanatory diagram schematically illustrating a one-dimensional training image signal according to the first embodiment. FIG. 3D is an explanatory diagram schematically illustrating a matrix according to the first embodiment.

DESCRIPTION OF EMBODIMENTS

Hereinafter, embodiments of the present disclosure will be described in detail with reference to the drawings.

First Embodiment

A training device 100 according to a first embodiment will be described with reference to FIGS. 1 to 5.

A configuration of a main part of a training system 10 to which the training device 100 according to the first embodiment is applied will be described with reference to FIG. 1.

Figures 1, 2:
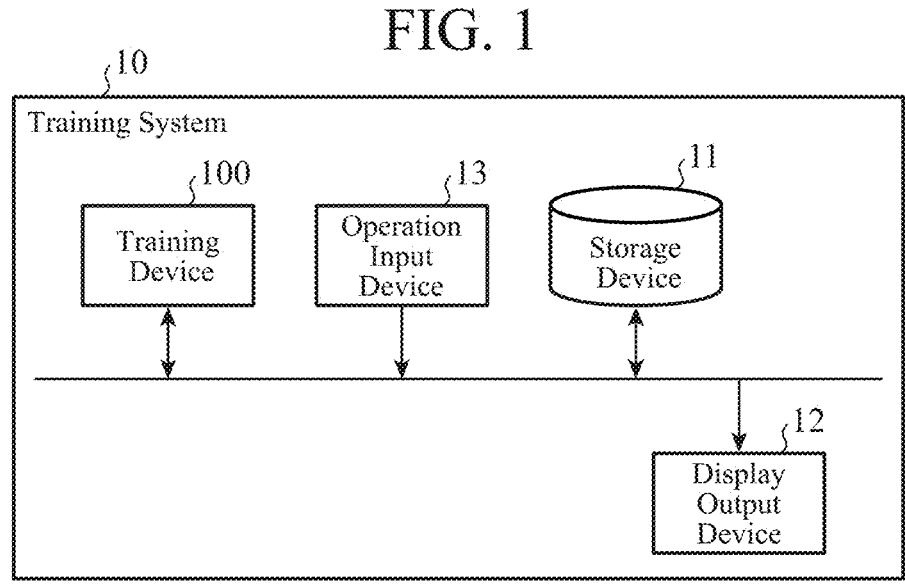
FIG. 1 is a block diagram illustrating an example of a configuration of a main part of a training system to which a training device according to a first embodiment is applied.
FIG. 2 is a block diagram illustrating an example of a configuration of a main part of the training device according to the first embodiment.

FIG. 1 is a block diagram illustrating an example of the configuration of the main part of the training system 10 to which the training device 100 according to the first embodiment is applied.

The training system 10 includes a storage device 11, a display output device 12, an operation input device 13, and the training device 100.

The storage device 11 is a device that stores information necessary for the training device 100 to execute predetermined processing determined in advance. The training device 100 can acquire the information by reading the information stored in the storage device 11. In addition, the storage device 11 receives the information output from the training device 100 and stores the received information.

The display output device 12 is a device such as a display that acquires a display image signal and displays a display image indicated by the display image signal. The display output device 12 receives the display image signal output from the training device 100, and displays the display image indicated by the display image signal.

The operation input device 13 is a device such as a keyboard or a pointing device that receives operations by a user (hereinafter referred to as "user operation") and outputs an operation signal based on the user operation. The operation input device 13 is not limited to a keyboard or a pointing device, and may be a touch panel, a touch sensor, or the like as long as it can output an operation signal based on a user operation in response to operations by the user.

The operation input device 13 outputs an operation signal to the training device 100.

The training device 100 acquires training image information indicating a training image and generates a trained model based on the training image.

The display output device 12 and the operation input device 13 provide an interactive user interface for a user who operates the training device 100.

That is, the user can cause the training device 100 to perform control desired by the user by performing a user operation using the operation input device 13 while checking the display image displayed on the display output device 12.

A configuration of a main part of the training device 100 according to the first embodiment will be described with reference to FIG. 2.

FIG. 2 is a block diagram illustrating an example of the configuration of the main part of the training device 100 according to the first embodiment.

The training device 100 includes a training image acquiring unit 110, a one-dimensional training image generating unit 120, a matrix generating unit 130, a singular value decomposing unit 140, a trained model generating unit 150, and a trained model output unit 160.

In addition to the above-described configuration, the training device 100 may include a captured image acquiring unit 111, or the captured image acquiring unit 111 and a clustering unit 112.

Hereinafter, as illustrated in FIG. 2, the training device 100 will be described as including the training image acquiring unit 110, the captured image acquiring unit 111, the clustering unit 112, the one-dimensional training image generating unit 120, the matrix generating unit 130, the singular value decomposing unit 140, the trained model generating unit 150, and the trained model output unit 160.

Note that, as a configuration not illustrated in FIG. 2, it is assumed that the training device 100 includes an operation acquiring unit that acquires an operation signal output from the operation input device 13, and a display image output unit that generates a display image based on the operation signal acquired by the operation acquiring unit and outputs a display image signal indicating the display image to the display output device 12.

The training image acquiring unit 110 acquires the training image information indicating the training image.

Specifically, the training image acquiring unit 110 acquires a plurality of pieces of the training image information different from each other.

More specifically, for example, the training image acquiring unit 110 acquires the plurality of pieces of the training image information different from each other by reading the training image information from the storage device 11 in which the training image information indicating each of a plurality of training images is stored in advance.

The training image information acquired by being read from the storage device 11 by the training image acquiring unit 110 is selected and acquired by the user operating the operation input device 13, for example.

Hereinafter, a description will be given assuming that the training image acquiring unit 110 acquires m (m is an integer equal to or more than 2 determined in advance) pieces of the training image information different from each other. In addition, a training image indicated by each of the m pieces of the training image information acquired by the training image acquiring unit 110 will be described as a training image $w_i$ (i is any integer equal to or more than 1 and equal to or less than m).

The one-dimensional training image generating unit 120 generates a plurality of one-dimensional signals corresponding to the plurality of pieces of the training image informa- tion (hereinafter referred to as a "one-dimensional training image signals") by making the training image indicated by each of the plurality of pieces of the training image infor- mation acquired by the training image acquiring unit 110 into one dimension.

Specifically, for example, the one-dimensional training image generating unit 120 generates the one-dimensional training image signal by raster scanning the training image indicated by the training image information acquired by the training image acquiring unit 110.

More specifically, for example, the one-dimensional train- ing image generating unit 120 raster scans the training image indicated by each of the plurality of pieces of the training image information with respect to the plurality of pieces of the training image information acquired by the training image acquiring unit 110, thereby generating the one-dimen- sional training image signal corresponding to each piece of the training image information.

Hereinafter, the one-dimensional training image signal corresponding to the training image $w_i$ will be described as a one-dimensional training image signal $w_i'$.

The matrix generating unit 130 generates a matrix in which a plurality of one-dimensional training image signals generated by the one-dimensional training image generating unit 120 is arranged in parallel with each other.

Hereinafter, a matrix in which m one-dimensional training image signals from a one-dimensional training image signal $w_i'$ to a one-dimensional training image signal $w_m'$ are arranged in parallel with each other will be described as a matrix $W_m$.

Note that, in order for the matrix generating unit 130 to generate the matrix $W_m$, it is necessary that the pieces of the training image information, which are the basis of the one-dimensional training image signal $w_i'$ to the one-dimensional training image signal $w_m'$ and are acquired by the training image acquiring unit 110, have equal numbers of pixels.

With reference to FIG. 3, the training image $w_i$, the one-dimensional training image signal $w_i'$, and the matrix $W_m$ according to the first embodiment will be described.

FIG. 3A is an explanatory diagram schematically illus- trating the training image $w_i$ according to the first embodi- ment.

As illustrated in FIG. 3A, the training image $w_i$ is a rectangular image having p (p is a predetermined integer equal to or more than 1) pixels in the lateral direction and q (q is a predetermined integer equal to or more than 1) pixels in the vertical direction in FIG. 3A. Assuming that a product of p and q is n, the training image $w_i$ is a rectangular image having n pixels. Therefore, the training image $w_i$ is not limited to a captured image itself, and is only necessary to be a set of pixels arranged two-dimensionally, such as an image obtained by cutting out a captured image in a rect- angle (block) or performing image processing such as enlargement or reduction. FIG. 3B is an explanatory dia- gram schematically illustrating a modification of the training image according to the first embodiment. For example, as illustrated in FIG. 3B, each block obtained by dividing a captured image may be set as a training image. Bx and By indicate the numbers of pixels in the horizontal direction and the vertical direction of the divided block, respectively, and Sx and Sy indicate the numbers of moving pixels (step sizes) at respective division positions in the horizontal direction and the vertical direction. Furthermore, position indices (i, j) of each divided block $D_{i,j}$ are information for identifying the positional relationship of each block. In a case where $S_x=B_x$ and $S_y=B_y$, the blocks are adjacent to each other. In a case where $S_x<B_x$ or $S_y<B_y$, the blocks are divided in such a way that adjacent blocks have an overlap. In a case where $S_x>B_x$ or $S_y>B_y$, a gap is generated between the divided blocks, and thus pixels not included as the training image are generated in the captured image. In general, the larger the region where adjacent blocks overlap, the more the patterns of the divided blocks increase, and the more the accuracy of training is improved. On the other hand, since the number of training images increases, the training speed decreases. Therefore, since the training accuracy and the training speed are in a trade-off relationship, $B_x$, $B_y$, $S_x$, and $S_y$ are elements sub- jected to tuning by the user or the like. For example, by the user operating the operation input device 13, tuning (setting of values) of $B_x$, $B_y$, $S_x$, and $S_y$ is performed.

The training image $w_i$ may be a monochrome image in which each pixel is indicated by one bit, a grayscale image in which it is indicated by a bit string of 8 bits or the like, or a color image in which it is indicated by a bit string of 24 bits or the like. Furthermore, the training image $w_i$ may be a bitmap image in an RGB format or a bitmap image in a YUV format.

FIG. 3C is an explanatory diagram schematically illus- trating the one-dimensional training image signal $w_i'$ accord- ing to the first embodiment. As illustrated in FIG. 3C, the one-dimensional training image signal $w_i'$ is an image hav- ing n pixels in the lateral direction and one pixel in the vertical direction in FIG. 3C. In the one-dimensional train- ing image signal $w_i'$, each pixel in the one-dimensional training image signal $w_i'$ is configured by bits or bit strings having the same number of bits as each pixel in the training image $w_i$.

FIG. 3D is an explanatory diagram schematically illus- trating the matrix $W_m$ according to the first embodiment.

As illustrated in FIG. 3D, the matrix $W_m$ is obtained by arranging the one-dimensional training image signal $w_i'$ in the column direction, and is a matrix of pixel signals having n pixels in the lateral direction and m pixels in the vertical direction.

In the matrix $W_m$, each component in the matrix $W_m$ is formed by the same number of bits or bit strings as that of each pixel in the training image $w_i$.

The singular value decomposing unit 140 calculates a right singular vector and a singular value by performing singular value decomposition (SVD) on the matrix $W_m$ generated by the matrix generating unit 130.

Here, although it is a well-known technique, the singular value decomposition will be briefly described.

In a case where a matrix $A_{m \times n}$ is a matrix of m rows and n columns, the singular value decomposition of the matrix $A_{m \times n}$ can be expressed by the following Expression (1).

$$A_{m \times n} = U_{m \times m} \Gamma_{m \times n} V^T_{n \times n} \qquad \text{Expression (1)}$$

Here, $U_{m \times m}$ is a unitary matrix of m rows and m columns, and $V^T_{n \times n}$ is a transposed matrix of $V_{n \times n}$ that is a unitary matrix of n rows and n columns. In addition, a matrix $\Gamma_{m \times n}$ is a matrix of m rows and n columns, and the matrix other than the diagonal components is always zero. Furthermore, when a diagonal component of i rows and i columns in the matrix $\Gamma_{m \times n}$ is $\sigma_i$ and I is an order (rank) of $A_{m \times n}$, I is an integer equal to or more than 1 and equal to or less than M (M=min(m, n), min(m, n) represents the smaller value between m and n), and $\sigma_1$, $\sigma_2$, . . . , and $\sigma_I$ represent I singular values of the matrix $A_{m \times n}$ satisfying the following Expression (2).

$$\sigma_1 > \sigma_2 > \ldots > \sigma_I > 0 \qquad \text{Expression (2)}$$

Here, in a case where $I < M$, $\sigma_{I+1} = \ldots = \sigma_M = 0$. That is, in Expression (1), the matrix $\Gamma_{m \times n}$ is a matrix in which non-zero components are formed only by a set of singular values of the matrix $A_{m \times n}$. Furthermore, in Expression (1), each column vector in the matrix $U_{m \times m}$ represents a left singular vector of the matrix $A_{m \times n}$. That is, the matrix $U_{m \times m}$ represents a set of left singular vectors of the matrix $A_{m \times n}$. Furthermore, in Expression (1), each column vector in the matrix $V_{n \times n}$ represents a right singular vector of the matrix $A_{m \times n}$. That is, the matrix $V_{n \times n}$ represents a set of right singular vectors of the matrix $A_{m \times n}$.

When Expression (1) is applied, matrices (hereinafter "approximation matrices") $A^{\sim}_{m \times n}$ approximating the matrix $A_{m \times n}$ can be expressed by using the following Expression (3).

$$A_{m \times n} \approx A^{\sim}_{m \times n} = U_{m \times r} \Gamma_{r \times r} V^T_{r \times n} \qquad \text{Expression (3)}$$

Here, the matrix $\Gamma_{r \times r}$ is a diagonal matrix of r rows and r columns having r (r is an integer equal to or more than 1 and equal to or less than I) diagonal components, and the matrix $\Gamma_{r \times r}$ has $\sigma_1$, $\sigma_2$, . . . , $\sigma_r$ among the diagonal components in the matrix $\Gamma_{m \times n}$ as the diagonal components. Further, $U_{m \times r}$ is a matrix of m rows and r columns configured with components from the left to r columns of the matrix $U_{m \times m}$, and similarly, the matrix $V^T_{r \times n}$ is a transposed matrix of a matrix $V_{n \times r}$ of n rows and r columns configured with components from the left to r columns of $V_{n \times n}$. As is clear from Expression (3), since this approximation represents a singular value decomposition of a matrix having r singular values, the matrices $A^{\sim}_{m \times n}$ represent the low-rank approximation at the rank r of the matrix $A_{m \times n}$ of the rank I.

The singular value decomposing unit 140 calculates a right singular vector and a singular value satisfying the following Expression (4) corresponding to Expression (1) by performing the singular value decomposition on the matrix $W_m$ generated by the matrix generating unit 130.

$$W_m = U_{m \times m} \Gamma_{m \times n} V^T_{n \times n} \qquad \text{Expression (4)}$$

The trained model generating unit 150 generates a trained model on the basis of the right singular vector and the singular value calculated by the singular value decomposing unit 140.

The trained model generated by the trained model generating unit 150 outputs an inference result using, as an explanatory variable, a signal (hereinafter referred to as a "one-dimensional inference target image signal") indicating an image obtained by making an image (hereinafter referred to as an "inference target image") having the same number of pixels as the training image in both the horizontal direction and the vertical direction into one dimension. Here, the inference target image is an image (hereinafter referred to as an "inference captured image") obtained by image-capturing an object as an inference target (hereinafter referred to as an "inference target object") or an image obtained by performing image processing on the inference captured image.

Specifically, the trained model generating unit 150 generates a trained model based on a combination of r singular values predetermined in descending order of values among the singular values calculated by the singular value decomposing unit 140 and a matrix having a set of right singular vectors corresponding to a diagonal matrix that is a combination of the r singular values.

More specifically, for example, the trained model generating unit 150 generates matrices $\Gamma_{r \times r}$ and $V^T_{n \times r}$ that satisfy the following Expression (5) as parameters of the trained model.

$$W_m \approx U_{m \times r} \Gamma_{r \times r} V^T_{n \times r} \qquad \text{Expression (5)}$$

Here, the matrix $\Gamma_{r \times r}$ is a diagonal matrix of r rows and r columns in which r singular values are arranged diagonally. Furthermore, the matrix $V^T_{n \times r}$ is a transposed matrix of a matrix $V_{n \times r}$ representing a set of right singular vectors of $W_m$ corresponding to the matrix $\Gamma_{r \times r}$ in Expression (5). In addition, the right singular vector is a column vector of $V_{n \times r}$ (in a case of $V^T_{n \times r}$, it is a row vector because of being transposed).

Note that the number of singular values (rank of approximate matrix of $W_m$) r employed by the trained model generating unit 150 in descending order of values among the singular values calculated by the singular value decomposing unit 140 may be acquired by the trained model generating unit 150 on the basis of a user operation even if the trained model generating unit 150 holds information indicating the number.

Note that, in a case where r is determined in advance, the singular value decomposing unit 140 may increase the speed of the singular value decomposition or reduce the memory by using, for example, a technique related to a high-speed solution in the singular value decomposition described in Literature 1 below.

Literature 1: "Matthew Brand", "Fast Low-Rank Modifications of the Thin Singular Value Decomposition", "MITSUBISHI ELECTRIC RESEARCH LABORATORIES", [searched on Dec. 4, 2020], Internet (URL: https://www.merl.com/publications/docs/TR2006-059.pdf)

In Literature 1, when the singular value decomposition is performed, first, a normal singular value decomposition operation is performed on r rows (matrix $A_{r \times n}$) of the matrix $A_{m \times n}$ with respect to the matrix $A_{m \times n}$ of the singular value decomposition target, and singular value decomposition matrices $U_{m \times r}'$, $\Gamma_{r \times r}'$, and $V^T_{n \times r}'$ are obtained. Then, for the remaining m−r rows, sequential update processing is performed on the singular value decomposition matrices $U_{m \times r}'$, $\Gamma_{r \times r}'$, and $V^T_{n \times r}'$. Specifically, singular value decomposition of the matrix $A_{m \times n}$ is achieved by repeatedly performing a matrix operation (hereinafter referred to as "update operation") of updating from the singular value decomposition matrix obtained by the previous update processing to the singular value decomposition matrix of the matrix $A_{(r+J) \times n}$ (J is the sum of j up to the update processing) by any j row (j is an integer equal to or more than 1) until r+J=m. Since this update operation has a smaller operation amount than the operation processing of the normal singular value decomposition, it is generally faster and more memory saving than performing the singular value decomposition operation of the matrix $A_{m \times n}$ at a time. In this calculation, the number of rows j to be processed may change for each update operation. For example, in a case where m−r=20, t can be set in any manner such as three rows, seven rows, one row, two rows, two rows, and five rows in order for the remaining 20 rows.

Since the update operation can be performed in any number of rows as described above, additional training can also be performed by the singular value decomposition described in Literature 1. That is, not only the matrices $\Gamma_{r \times r}$ and $V^T_{n \times r}$ but also the matrix $U_{m \times r}$ are held as the trained model of $W_m$. Thus, by performing the matrix operation of updating the singular value decomposition matrices $U_{m \times r}$, $\Gamma_{r \times r}$, and $V^T_{n \times r}$ being already obtained by using the matrix $W_1$ in which 1 one-dimensional training image signals to be additionally trained with are arranged in parallel with each other, the same training model (matrix $U_{(m+1) \times r}''$, $\Gamma_{r \times r}''$, $V^T_{n \times r}''$) as in a case of performing the singular value decomposition on the matrix $W_{m+1}$ in which the matrix $W_m$ and the matrix $W_1$ are connected in a row direction is obtained. In a case where the update operation is not used, it is impossible to perform additional training and it is necessary to perform normal singular value decomposition on the matrix $W_{m+1}$ as retraining, and thus high-speed and memory-saving additional training processing can be achieved by the update operation. Note that the update operation may be used for both the first training and the additional training, or the update operation may be used only for the additional training.

Furthermore, Literature 1 describes a technique of achieving a singular value decomposition operation of a matrix $A_{m \times n, a}$ obtained by excluding one row vector a selected from the matrix $A_{m \times n}$ with respect to the matrices $U_{m \times r}$, $\Gamma_{r \times r}$, and $V^T_{n \times r}$ after the singular value decomposition of the matrix $A_{m \times n}$ only by an update operation from the already obtained matrices $U_{m \times r}$, $\Gamma_{r \times r}$, and $V^T_{n \times r}$ using the row vector a. By introducing this technique, even in a case where an image inappropriate for training due to a human error or the like is mixed in the training image signal used in the trained model (matrix $U_{m \times r}$, $\Gamma_{r \times r}$, $V^T_{n \times r}$), the trained model (matrix $U_{(m-1) \times r}'''$, $\Gamma_{r \times r}'''$, $V^T_{n \times r}'''$) from which an inappropriate one-dimensional training image signal $w_d'$ (corresponding to the row vector a) is excluded can be obtained by high-speed and memory-saving calculation.

In a case where there is a plurality of training images to be excluded, it is sufficient if the above processing is repeated sequentially.

Furthermore, Literature 1 describes a technique for achieving singular value decomposition operations of a matrix $A_{m \times n, a'-a}$ obtained by excluding one row vector a selected from the matrix $A_{m \times n}$ and adding one new row vector a' to the matrices $U_{m \times r}$, $\Gamma_{r \times r}$, and $V^T_{n \times r}$ after the singular value decomposition only by update operations from the matrices $U_{m \times r}$, $\Gamma_{r \times r}$, and $V^T_{n \times r}$ being already obtained using the row vector a and the row vector a'. By introducing this technique, even in a case where an image different from an image to be originally trained is mixed in the training image signal used in the trained model (matrix $U_{m \times r}$, $\Gamma_{r \times r}$, $V^T_{n \times r}$) due to a human error or the like, the trained model (matrix $U_{m \times r}''''$, $\Gamma_{r \times r}''''$, $V^T_{n \times r}''''$) in a case where the inappropriate one-dimensional training image signal $w_d'$ (corresponding to the row vector a) is replaced with a correct one-dimensional training image signal $w_a'$ (corresponding to the row vector a') can be obtained by high-speed and memory-saving calculation.

In a case where there is a plurality of training images to be replaced, it is sufficient if the above processing is repeated sequentially.

For example, when the one-dimensional inference target image signal is input as an explanatory variable, the trained model generating unit 150 generates a trained model that outputs an approximate signal (hereinafter referred to as a "one-dimensional approximate signal") of the one-dimensional inference target image signal as an inference result on the basis of the right singular vector and the singular value calculated by the singular value decomposing unit 140.

Hereinafter, the one-dimensional approximate signal will be described as $w_t$.

$w_t$ can be expressed by the following Expression (6) using the matrix $\Gamma_{m \times n}$ and the matrix $V^T_{n \times n}$ in Expression (4).

$$w_t = u_t \Gamma_{m \times n} V^T_{n \times n} \qquad \text{Expression (6)}$$

Here, $u_t$ is a one-dimensional vector, and is a feature vector of $w_t$ including coefficients for restoring $w_t$ using the matrix $\Gamma_{m \times n}$ and the matrix $V^T_{n \times n}$. Since the matrix $\Gamma_{m \times n}$ and the matrix $V^T_{n \times n}$ are known by Expression (4), $u_t$ is uniquely determined when $w_t$ is determined.

When Expression (6) is applied, $w_t$ can be approximated by the following Expression (7) using the matrix $\Gamma_{r \times r}$ and the matrix $V^T_{n \times r}$ in Expression (5).

$$w_t \approx w_t^{\tilde{}} = u_t^{\tilde{}} \Gamma_{r \times r} V^T_{n \times r} \qquad \text{Expression (7)}$$

Here, $w_t^{\tilde{}}$ is a one-dimensional approximate signal approximating $w_t$. Further, $u_t^{\tilde{}}$ is a feature vector (hereinafter referred to as "approximate feature vector") obtained by reducing the number of dimensions of $u_t$, which is a feature vector of $w_t$, to r dimensions, and the following Expression (8) can be obtained.

$$u_t^{\tilde{}} = w_t^{\tilde{}} V_{n \times r} \Gamma_{r \times r}^{-1} \approx w_t V_{n \times r} \Gamma_{r \times r}^{-1} \qquad \text{Expression (8)}$$

Here, $\Gamma_{r \times r}^{-1}$ is an inverse matrix of $\Gamma_{r \times r}$.

As described above, when $w_t$, which is a one-dimensional inference target image signal, is input as an explanatory variable, the trained model generating unit 150 generates a trained model that outputs $w_t^{\tilde{}}$, which is a one-dimensional approximate signal, on the basis of, for example, Expression (7).

In addition, when the one-dimensional inference target image signal is input as an explanatory variable, the trained model generating unit 150 may generate a trained model that outputs a feature vector of an inference target image corresponding to the one-dimensional inference target image signal as an inference result on the basis of the right singular vector and the singular value calculated by the singular value decomposing unit 140.

In this case, for example, when the one-dimensional inference target image signal is input as an explanatory variable, the trained model generating unit 150 generates a trained model that outputs, as an inference result, a feature vector $u_t^{\tilde{}}$ that is a feature vector of an inference target image corresponding to the one-dimensional inference target image signal and in which the number of dimensions of the feature vector $u_t$ is reduced to r dimensions.

As described above, when $w_t$ that is a one-dimensional inference target image signal is input as an explanatory variable, the trained model generating unit 150 may generate a trained model that outputs $u_t$ that is the approximate feature vector of an inference target image corresponding to the one-dimensional inference target image signal on the basis of, for example, Expression (8).

The trained model output unit 160 outputs the trained model generated by the trained model generating unit 150 as trained model information.

Specifically, for example, the trained model output unit 160 outputs the trained model information to the storage device 11 and causes the storage device 11 to store the trained model information.

With the above configuration, the training device 100 can generate a trained model not configured by a deep neural network in which the intermediate layers are multilayered. Consequently, since the training device 100 can generate a trained model that enables highly accurate inference by the singular value decomposition performed once without requiring iterative optimization processing of parameters, it is possible to generate a trained model that enables highly accurate inference in a short time compared to the related art.

In the above description, the training image acquiring unit 110 is assume to acquire a plurality of pieces of mutually different pieces of training image information generated in advance by reading the training image information from the storage device 11, but the method of acquiring the training image information by the training image acquiring unit 110 is not limited thereto.

For example, the training image acquiring unit 110 may generate and acquire the training image information on the basis of information indicating an image different from the training image information and indicating an image (hereinafter referred to as a "captured image") acquired by image-capturing a target object (hereinafter referred to as "captured image information").

In order for the training image acquiring unit 110 to generate and acquire the training image information on the basis of the captured image information, for example, the training device 100 includes the captured image acquiring unit 111 as illustrated in FIG. 2.

The captured image acquiring unit 111 acquires captured image information indicating a captured image acquired by image-capturing the target object.

Specifically, the captured image acquiring unit 111 acquires captured image information corresponding to each of a plurality of different target objects.

For example, the captured image acquiring unit 111 acquires the captured image information corresponding to each of the plurality of different target objects by reading the captured image information from the storage device 11 in which captured image information that is a plurality of pieces of captured image information and respectively corresponds to the plurality of different target objects is stored in advance.

In this case, for example, regarding the captured image indicated by each of the plurality of pieces of captured image information acquired by the captured image acquiring unit 111, the training image acquiring unit 110 divides the captured image into a plurality of image regions and acquires partial images corresponding to respective image regions. The training image acquiring unit 110 acquires partial image information indicating each of the plurality of partial images based on the captured image for each piece of the captured image information, thereby acquiring, as the training image information, a plurality of pieces of partial image information corresponding to each of the plurality of pieces of captured image information acquired by the captured image acquiring unit 111. A specific example of the divided image is the divided block described above in FIG. 3B.

Furthermore, in this case, the matrix generating unit 130 generates a matrix by arranging, in parallel with each other, a plurality of one-dimensional training image signals corresponding to a plurality of pieces of the partial image information satisfying one or more predetermined conditions out of a plurality of pieces of the partial image information that is acquired by the training image acquiring unit 110 and corresponds to each of the plurality of pieces of captured image information acquired by the captured image acquiring unit 111.

Here, the plurality of pieces of partial image information satisfying the predetermined condition is, for example, partial image information corresponding to the same image region in the captured image indicated by each of the plurality of pieces of captured image information. When the plurality of divided blocks Dj have the position indices (i, j) coinciding with each other in FIG. 3B, they have the same image region.

That is, for example, the matrix generating unit 130 generates a matrix by arranging a plurality of one-dimensional training image signals generated by the one-dimensional training image generating unit 120 in parallel with each other on the basis of the partial image information corresponding to the same image region in the captured image indicated by each of the plurality of pieces of captured image information acquired by the captured image acquiring unit 111.

The singular value decomposing unit 140 arranges the one-dimensional training image signals generated by the one-dimensional training image generating unit 120 in parallel with each other on the basis of the partial image information, thereby calculating the right singular vector and the singular value in the matrix generated by the matrix generating unit 130.

In addition, the trained model generating unit 150 generates a trained model that outputs the right singular vector and the singular value corresponding to a matrix based on the partial image information generated by the matrix generating unit 130.

With the above configuration, the training device 100 can generate a trained model that sets an image (partial image) in a predetermined image region in an image (captured image) obtained by image-capturing an inference target object as an inference target image, and outputs the one-dimensional approximate signal corresponding to the inference target image or a feature vector of the inference target image as an inference result when a one-dimensional inference target image signal corresponding to the inference target image is input as an explanatory variable.

Consequently, the training device 100 can generate the trained model that enables highly accurate inference specialized for the partial image in the predetermined image region in the captured image obtained by image-capturing the inference target object in a short time compared to the related art.

The matrix generating unit 130 may generate a corresponding matrix for each condition on the basis of one or more predetermined conditions.

Specifically, for example, the matrix generating unit 130 generates a matrix corresponding to each of the plurality of image regions in the captured image. The plurality of image regions is a region in which a plurality of divided blocks $D_{i,j}$ is combined in FIG. 3B. For example, it is a region obtained by combining four in the horizontal direction and two in the vertical direction. Hereinafter, this region is referred to as a "segment". Here, an example of the largest segment is a case where one segment is generated in the entire image, and in this case, the number of trained models to be generated is one, and a memory capacity required for storing the trained model can be reduced. The size of each segment may be different. In a case where what is shown in which position of the captured image is known in advance, the feature of the image can be divided in each segment by performing explicit segment division (for example, dividing into a subject and a background), and an image pattern to be learned can be narrowed down, so that it is possible to implement highly efficient training that enables highly accurate inference (image generation) with a limited number of trained models (the number of segments).

On the other hand, in a case where one segment is formed for each position of one partial image of the smallest segment, in this case, the number of segments is the number of partial image divisions. Therefore, although the number of training models increases, training specialized for each partial image position becomes possible, and very highly accurate inference (image generation) becomes possible. Note that this case is the same as the case of the condition described in paragraph 0046.

In this case, for example, the singular value decomposing unit 140 calculates the right singular vector and the singular value for the matrix for each condition generated by the matrix generating unit 130.

Specifically, for example, the singular value decomposing unit 140 calculates the right singular vector and the singular value corresponding to each of the plurality of matrices for the matrix corresponding to each of the plurality of image regions in the captured image generated by the matrix generating unit 130.

Furthermore, in this case, the trained model generating unit 150 generates the trained model corresponding to the matrix for each condition on the basis of the right singular vector and the singular value calculated by the singular value decomposing unit 140 corresponding to the matrix for each condition generated by the matrix generating unit 130.

Specifically, for example, for the matrix corresponding to each of the plurality of image regions in the captured image generated by the matrix generating unit 130, the trained model generating unit 150 generates a trained model corresponding to each of the plurality of matrices on the basis of the right singular vector and the singular value calculated by the singular value decomposing unit 140 corresponding to each of the plurality of matrices.

With the above configuration, the training device 100 can generate, for each image region, a trained model that sets an image (partial image) in each of a plurality of predetermined image regions in an image (captured image) obtained by image-capturing an inference target object as an inference target image, and outputs the one-dimensional approximate signal corresponding to each of the plurality of inference target images or a feature vector corresponding to each of the plurality of inference target images as an inference result when a one-dimensional inference target image signal corresponding to each of the plurality of inference target images is input as an explanatory variable to a trained model generated using the partial image of the same image region.

Consequently, the training device 100 can generate the trained model that enables highly accurate inference specialized for the partial image in each of the plurality of predetermined image regions in the captured image obtained by image-capturing the inference target object for each image region in a short time compared to the related art.

As illustrated in FIG. 2, the training device 100 may include the captured image acquiring unit 111 and the clustering unit 112.

The clustering unit 112 clusters the partial images indicated by each of the plurality of pieces of partial image information that is acquired by the training image acquiring unit 110, and corresponds to each of the plurality of pieces of captured image information acquired by the captured image acquiring unit 111.

In a case where the training device 100 includes the captured image acquiring unit 111 and the clustering unit 112, for example, the matrix generating unit 130 generates a matrix by arranging a plurality of one-dimensional training image signals generated by the one-dimensional training image generating unit 120 in parallel with each other for each of a plurality of partial images belonging to each class classified on the basis of a result of clustering by the clustering unit 112.

For example, there is a method of using a clustering method such as k-means clustering, hierarchical clustering, density-based spatial clustering of applications with noise (DBSCAN), or gaussian mixture model (GMM) on any one of partial images themselves, images obtained by performing feature transformation on partial images (for example, an edge image or an orthogonally transformed image) themselves, images obtained by performing filter processing such as smoothing processing or pooling processing on these, or signals obtained by making a set of these images into one dimension.

The plurality of pieces of partial image information is partial image information indicating each of the plurality of partial images belonging to each class classified on the basis of the result of clustering by the clustering unit 112.

With the above configuration, the training device 100 can generate, for each class, a trained model that sets a partial image belonging to a predetermined class in each of a plurality of image regions in an image (captured image) obtained by image-capturing an inference target object as an inference target image, and outputs the one-dimensional approximate signal corresponding to the inference target image or a feature vector corresponding to the inference target image as an inference result when the one-dimensional inference target image signal corresponding to the inference target image is input as an explanatory variable to a trained model generated using a plurality of partial images belonging to the class.

Consequently, the training device 100 can generate the trained model that enables highly accurate inference specialized for the partial image belonging to the predetermined class in the image obtained by image-capturing the inference target object in a short time compared to the related art.

Furthermore, the matrix generating unit 130 may generate a matrix corresponding to each class.

In this case, for example, the singular value decomposing unit 140 calculates the right singular vector and the singular value for each matrix for the matrix corresponding to each class generated by the matrix generating unit 130.

Furthermore, in this case, the trained model generating unit 150 generates a trained model corresponding to each class on the basis of the right singular vector and the singular value corresponding to each class generated by the matrix generating unit 130.

With the above configuration, the training device 100 can generate, for each class, the trained model that enables highly accurate inference specialized for the partial image in each of a plurality of image regions in an image (captured image), in particular to images belonging to each of the classes, obtained by image-capturing an inference target object in a short time compared to the related art.

A hardware configuration of the main part of the training device 100 according to the first embodiment will be described with reference to FIGS. 4A and 4B.

Figure 4A:
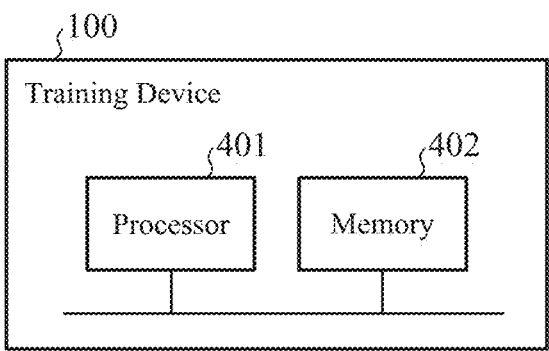
FIGS. 4A and 4B are diagrams illustrating an example of a hardware configuration of the main part of the training device according to the first embodiment.
Figure 4B:
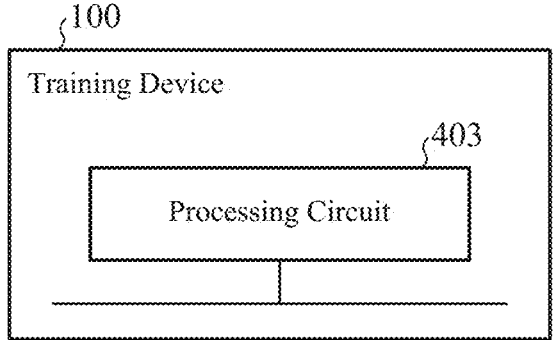

FIGS. 4A and 4B are diagrams illustrating an example of a hardware configuration of the main part of the training device 100 according to the first embodiment.

As illustrated in FIG. 4A, the training device 100 is configured by a computer, and the computer includes a processor 401 and a memory 402. The memory 402 stores a program for causing the computer to function as the training image acquiring unit 110, the captured image acquiring unit 111, the clustering unit 112, the one-dimensional training image generating unit 120, the matrix generating unit 130, the singular value decomposing unit 140, the trained model generating unit 150, and the trained model output unit 160. The processor 401 reads and executes the program stored in the memory 402, thereby implementing the training image acquiring unit 110, the captured image acquiring unit 111, the clustering unit 112, the one-dimensional training image generating unit 120, the matrix generating unit 130, the singular value decomposing unit 140, the trained model generating unit 150, and the trained model output unit 160.

In addition, as illustrated in FIG. 4B, the training device 100 may be configured by a processing circuit 403. In this case, the functions of the training image acquiring unit 110, the captured image acquiring unit 111, the clustering unit 112, the one-dimensional training image generating unit 120, the matrix generating unit 130, the singular value decomposing unit 140, the trained model generating unit 150, and the trained model output unit 160 may be implemented by the processing circuit 403.

Furthermore, the training device 100 may include the processor 401, the memory 402, and the processing circuit 403 (not illustrated). In this case, part of the functions of the training image acquiring unit 110, the captured image acquiring unit 111, the clustering unit 112, the one-dimensional training image generating unit 120, the matrix generating unit 130, the singular value decomposing unit 140, the trained model generating unit 150, and the trained model output unit 160 may be implemented by the processor 401 and the memory 402, and the remaining functions may be implemented by the processing circuit 403.

The processor 401 uses, for example, a central processing unit (CPU), a graphics processing unit (GPU), a microprocessor, a microcontroller, or a digital signal processor (DSP).

The memory 402 uses, for example, a semiconductor memory or a magnetic disk. More specifically, the memory 402 uses a random access memory (RAM), a read only memory (ROM), a flash memory, an erasable programmable read only memory (EPROM), an electrically erasable programmable read-only memory (EEPROM), a solid state drive (SSD), a hard disk drive (HDD), or the like.

The processing circuit 403 uses, for example, an application specific integrated circuit (ASIC), a programmable logic device (PLD), a field-programmable gate array (FPGA), a system-on-a-chip (SoC), or a system large-scale integration (LSI).

The operation of the training device 100 according to the first embodiment will be described with reference to FIG. 5.

Figure 5:
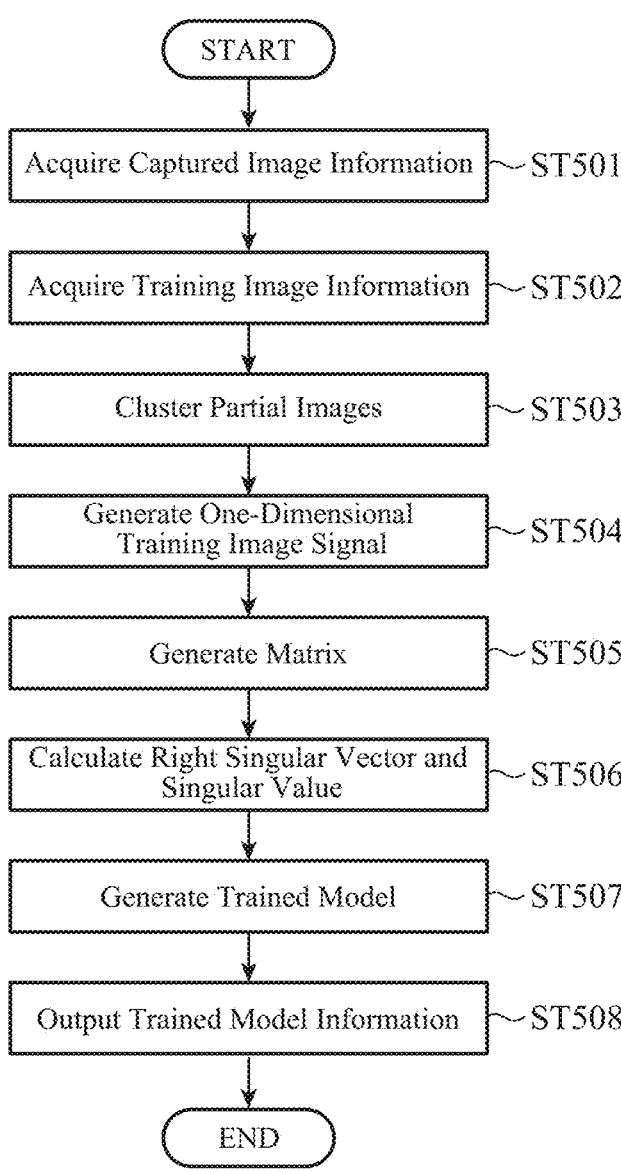
FIG. 5 is a flowchart illustrating an example of processing performed in the training device according to the first embodiment.

FIG. 5 is a flowchart illustrating an example of processing performed in the training device 100 according to the first embodiment.

Note that FIG. 5 is a flowchart in a case where the training device 100 includes the captured image acquiring unit 111 and the clustering unit 112 in addition to the training image acquiring unit 110, the one-dimensional training image generating unit 120, the matrix generating unit 130, the singular value decomposing unit 140, the trained model generating unit 150, and the trained model output unit 160.

In a case where the training device 100 does not include the clustering unit 112, or the captured image acquiring unit 111 and the clustering unit 112, in FIG. 5, the processing performed by the captured image acquiring unit 111 or the clustering unit 112 can be appropriately omitted.

First, in step ST501, the captured image acquiring unit 111 acquires captured image information.

Next, in step ST502, the training image acquiring unit 110 acquires a plurality of pieces of partial image information corresponding to the plurality of pieces of captured image information as the training image information.

Next, in step ST503, the clustering unit 112 clusters the partial images indicated by each of the plurality of pieces of partial image information.

Next, in step ST504, the one-dimensional training image generating unit 120 generates a one-dimensional training image signal for a plurality of pieces of the training image information.

Next, in step ST505, the matrix generating unit 130 generates a matrix in which a plurality of one-dimensional training image signals is arranged in parallel with each other.

Next, in step ST506, the singular value decomposing unit 140 calculates a right singular vector and a singular value by performing the singular value decomposition on the matrix. However, in a case of performing the additional training processing, the update processing of the training model using the update operation according to Literature 1, such as excluding or replacing specific training data (paragraphs 0031 to 0033), the left singular vector is also obtained.

Next, in step ST507, the trained model generating unit 150 generates a trained model on the basis of the right singular vector and the singular value. However, in the case of performing the additional training processing, the update processing of the training model using the update operation according to Literature 1, such as excluding or replacing specific training data (paragraphs 0031 to 0033), the trained model is generated including the left singular vector.

Next, in step ST508, the trained model output unit 160 outputs the trained model as trained model information.

After step ST508, the training device 100 ends the processing of the flowchart.

An image processing device 200 according to the first embodiment will be described with reference to FIGS. 6 to 9.

Figure 6:
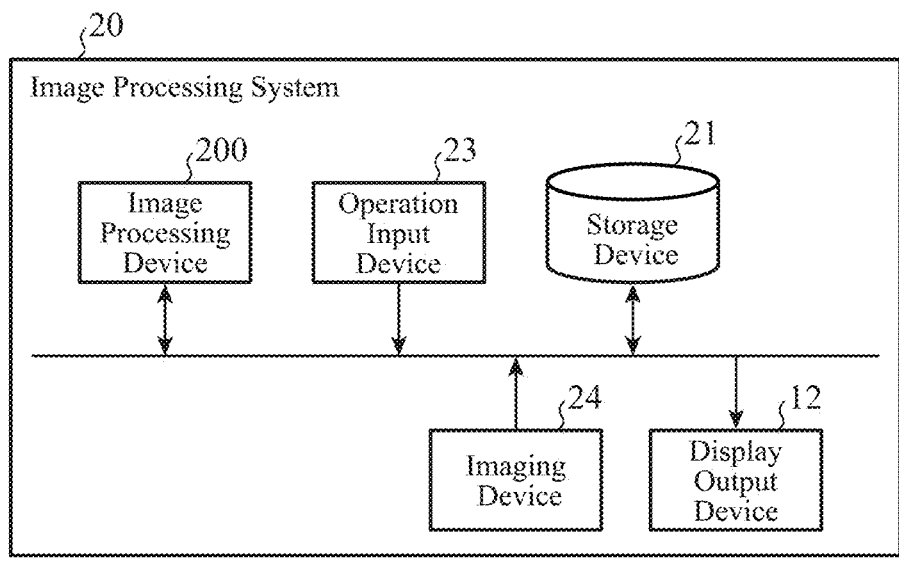
FIG. 6 is a block diagram illustrating an example of a configuration of a main part of an image processing system to which an image processing device according to the first embodiment is applied.

With reference to FIG. 6, a configuration of a main part of an image processing system 20 to which the image processing device 200 according to the first embodiment is applied will be described.

FIG. 6 is a block diagram illustrating an example of a configuration of a main part of an image processing system 20 to which the image processing device 200 according to the first embodiment is applied.

The image processing system 20 includes a storage device 21, a display output device 22, an operation input device 23, an imaging device 24, and the image processing device 200.

The storage device 21 is a device that stores information necessary for the image processing device 200 to execute predetermined processing determined in advance. Specifically, for example, the storage device 21 stores the trained model information output by the training device 100. The image processing device 200 acquires the trained model information by reading the trained model information stored in the storage device 21.

The display output device 22 is a device such as a display that acquires a display image signal and displays a display image indicated by the display image signal. The display output device 22 receives the display image signal output from the image processing device 200, and displays the display image indicated by the display image signal.

The operation input device 23 is a device such as a keyboard or a pointing device that receives a user operation and outputs an operation signal based on the user operation. The operation input device 23 is not limited to a keyboard or a pointing device, and may be a touch panel, a touch sensor, or the like as long as it can output an operation signal based on a user operation in response to the user operation. The operation input device 23 outputs an operation signal to the image processing device 200.

The imaging device 24 is a device such as a digital still camera that outputs an image (hereinafter referred to as a "captured inference image") obtained by image-capturing the inference target object as captured inference image information.

Specifically, the imaging device 24 outputs the captured inference image information to the image processing device 200.

The image processing device 200 is a device that acquires an inference result output by a trained model when a signal based on an inference target image is input to the trained model as an explanatory variable on the basis of an image (hereinafter referred to as an "inference target image") based on the captured inference image indicated by the captured inference image information and the trained model indicated by the trained model information, and acquires inference result information based on the acquired inference result.

The display output device 22 and the operation input device 23 provide an interactive user interface for a user who operates the image processing device 200.

That is, the user can cause the image processing device 200 to perform control desired by the user by performing a user operation using the operation input device 23 while checking the display image displayed on the display output device 22.

A configuration of a main part of the image processing device 200 according to the first embodiment will be described with reference to FIG. 7.

Figure 7:
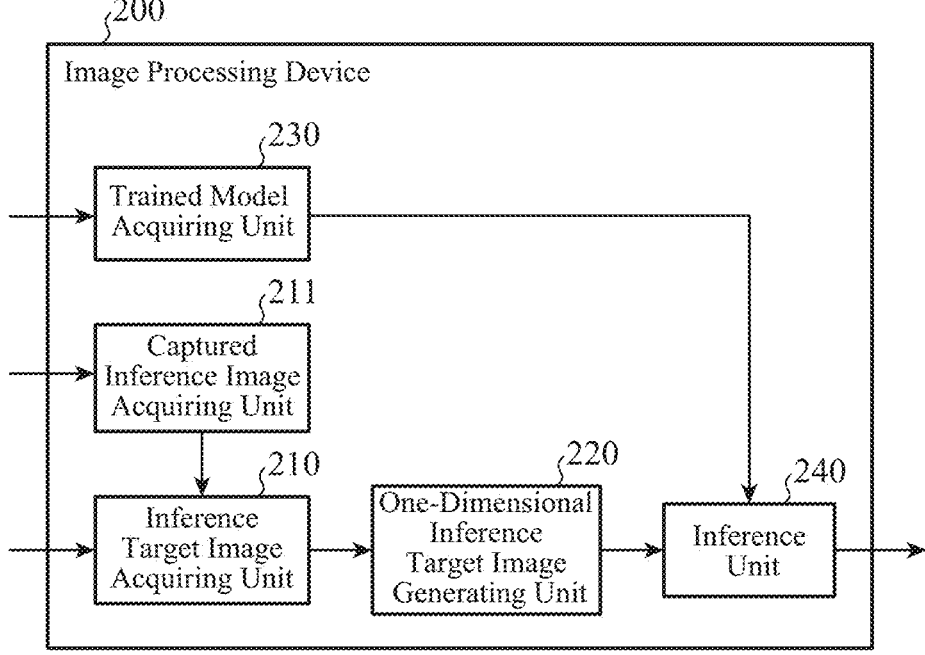
FIG. 7 is a block diagram illustrating an example of a configuration of a main part of the image processing device according to the first embodiment.

FIG. 7 is a block diagram illustrating an example of the configuration of the main part of the image processing device 200 according to the first embodiment.

The image processing device 200 includes an inference target image acquiring unit 210, a one-dimensional inference target image generating unit 220, and an inference unit 240.

The image processing device 200 may include a captured inference image acquiring unit 211 or a trained model acquiring unit 230 in addition to the above-described configuration.

Hereinafter, as illustrated in FIG. 7, the image processing device 200 will be described as including the inference target image acquiring unit 210, the captured inference image acquiring unit 211, the one-dimensional inference target image generating unit 220, the trained model acquiring unit 230, and the inference unit 240.

Note that the image processing device 200 includes, as a configuration not illustrated in FIG. 7, an operation acquiring unit that acquires an operation signal output from the operation input device 23 and a display image output unit that generates a display image and outputs a display image signal indicating the display image to the display output device 22.

The captured inference image acquiring unit 211 acquires captured inference image information indicating the captured inference image obtained by image-capturing the inference target object.

Specifically, for example, the captured inference image acquiring unit 211 acquires the captured inference image information output by the imaging device 24.

The method of acquiring the captured inference image information by the captured inference image acquiring unit 211 is not limited to the method of acquiring the captured inference image information output by the imaging device 24. For example, the captured inference image acquiring unit 211 may acquire the captured inference image information by reading the captured inference image information from the storage device 21 that stores the captured inference image information in advance.

The inference target image acquiring unit 210 acquires inference target image information indicating an image (inference target image) based on an image (captured inference image) obtained by image-capturing the inference target object.

Specifically, for example, the inference target image acquiring unit 210 acquires the inference target image information by reading the inference target image information from the storage device 21 that stores the inference target image information in advance.

The method of acquiring the inference target image information by the inference target image acquiring unit 210 is not limited to the method of reading from the storage device 21. For example, the inference target image acquiring unit 210 may acquire the captured inference image information acquired by the captured inference image acquiring unit 211 as the inference target image information. Furthermore, for example, the inference target image acquiring unit 210 may acquire the inference target image information by generating the inference target image information on the basis of the captured inference image information acquired by the captured inference image acquiring unit 211. The method of generating the inference target image information by the inference target image acquiring unit 210 on the basis of the captured inference image information will be described later.

The one-dimensional inference target image generating unit 220 generates a one-dimensional signal corresponding to the inference target image information (hereinafter referred to as a "one-dimensional inference target image signal") by making the inference target image indicated by the inference target image information acquired by the inference target image acquiring unit 210 into one dimension.

Specifically, for example, the one-dimensional inference target image generating unit 220 generates a one-dimensional inference target image signal by raster scanning the inference target image indicated by the inference target image information acquired by the inference target image acquiring unit 210.

Hereinafter, the inference target image indicated by the inference target image information acquired by the inference target image acquiring unit 210 will be described as an inference target image $w_t$, and a one-dimensional inference target image signal that corresponds to the inference target image $w_t$ and is generated by the one-dimensional inference target image generating unit 220 will be described as a one-dimensional inference target image signal $w_t^{\tilde{}}$.

The trained model acquiring unit 230 acquires the trained model information output by the training device 100. Specifically, for example, the trained model acquiring unit 230 acquires the trained model information by reading the trained model information from the storage device 21 that stores the trained model information in advance. The trained model acquiring unit 230 may acquire the trained model information from the training device 100, which is not illustrated in FIG. 6, via an information network such as a local area network (LAN).

Note that, in a case where the inference unit 240 holds the trained model information in advance, the trained model acquiring unit 230 is not a necessary configuration in the image processing device 200.

The inference unit 240 acquires inference result information corresponding to a one-dimensional inference target image signal on the basis of the one-dimensional inference target image signal generated by the one-dimensional inference target image generating unit 220. Specifically, the inference unit 240 inputs the one-dimensional inference target image signal to the trained model indicated by the trained model information as an explanatory variable, and acquires the inference result output by the trained model, thereby acquiring the inference result information based on the inference result.

In a case where the trained model generated by the training device 100 outputs the one-dimensional approximate signal corresponding to the one-dimensional inference target image signal as the inference result, for example, the inference unit 240 inputs the one-dimensional inference target image signal to the trained model as an explanatory variable, and acquires the one-dimensional approximate signal output by the trained model as the inference result. Furthermore, the inference unit 240 acquires, as inference result information, restored image information indicating a restored image generated from the one-dimensional approximate signal output as the inference result by the trained model. Specifically, for example, the inference unit 240 generates the restored image by mapping the one-dimensional approximate signal output as the inference result by the trained model to a two-dimensional image having the same size as the inference target image indicated by the inference target image information acquired by the inference target image acquiring unit 210. The inference unit 240 acquires the restored image information indicating the restored image as the inference result information by generating the restored image.

Furthermore, in a case where the trained model generated by the training device 100 outputs the feature vector of the inference target image corresponding to the one-dimensional inference target image signal as the inference result, for example, the inference unit 240 inputs the one-dimensional inference target image signal to the trained model as an explanatory variable, and acquires the feature vector of the inference target image corresponding to the one-dimensional inference target image signal, the feature vector being output as the inference result by the trained model. Furthermore, the inference unit 240 acquires, as the inference result information, feature vector information indicating a feature vector output as the inference result by the trained model.

With the above configuration, the image processing device 200 can perform highly accurate inference using the trained model generated in a short time compared to the related art.

The method of generating the inference target image information by the inference target image acquiring unit 210 on the basis of the captured inference image information will be described.

The inference target image acquiring unit 210 divides the captured inference image into a plurality of image regions with respect to the captured inference image indicated by the captured inference image information acquired by the captured inference image acquiring unit 211. The inference target image acquiring unit 210 generates and acquires partial inference image information indicating each of a plurality of images obtained by dividing the captured inference image into a plurality of image regions (hereinafter referred to as a "partial inference image"). The inference target image acquiring unit 210 acquires each of one or more predetermined pieces of partial inference image information out of a plurality of pieces of partial inference image information corresponding to the captured inference image information acquired by the captured inference image acquiring unit 211 as the inference target image information.

In a case where the inference target image acquiring unit 210 acquires the partial inference image information as the inference target image information, the one-dimensional inference target image generating unit 220 generates a one-dimensional inference target image signal corresponding to each of one or more pieces of the inference target image information acquired by the inference target image acquiring unit 210. The inference unit 240 acquires inference result information corresponding to the one-dimensional inference target image signal that is generated by the one-dimensional inference target image generating unit 220 and corresponds to each of one or more pieces of the inference target image information.

In this case, the trained model is a trained model generated by the training device 100 using a partial image as the training image, specifically, a trained model generated on the basis of a matrix generated by the training device 100 arranging one-dimensional training image signals based on partial images that are a plurality of partial images and correspond to the same image region in each of a plurality of captured images in parallel with each other. Therefore, there is one trained model for each defined image region.

With the above configuration, the image processing device 200 can perform highly accurate inference specialized for a partial image in each of one or more predetermined image regions in the captured inference image.

A hardware configuration of the main part of the image processing device 200 according to the first embodiment will be described with reference to FIGS. 8A and 8B.

Figure 8A:
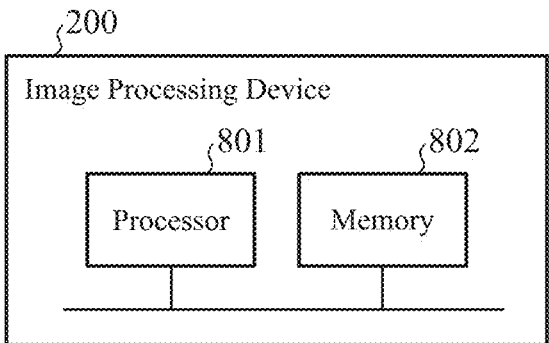
FIGS. 8A and 8B are diagrams illustrating an example of a hardware configuration of the main part of the image processing device according to the first embodiment.
Figure 8B:
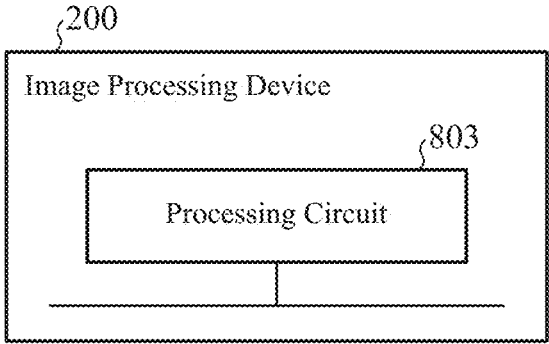

FIGS. 8A and 8B are diagrams illustrating an example of the hardware configuration of the main part of the image processing device 200 according to the first embodiment.

As illustrated in FIG. 8A, the image processing device 200 is configured by a computer, and the computer includes a processor 801 and a memory 802. The memory 802 stores a program for causing the computer to function as the inference target image acquiring unit 210, the captured inference image acquiring unit 211, the one-dimensional inference target image generating unit 220, the trained model acquiring unit 230, and the inference unit 240. The processor 801 reads and executes the program stored in the memory 802, thereby implementing the inference target image acquiring unit 210, the captured inference image acquiring unit 211, the one-dimensional inference target image generating unit 220, the trained model acquiring unit 230, and the inference unit 240.

In addition, as illustrated in FIG. 8B, the image processing device 200 may include a processing circuit 803. In this case, the functions of the inference target image acquiring unit 210, the captured inference image acquiring unit 211, the one-dimensional inference target image generating unit 220, the trained model acquiring unit 230, and the inference unit 240 may be implemented by the processing circuit 803.

Furthermore, the image processing device 200 may include the processor 801, the memory 802, and the processing circuit 803 (not illustrated). In this case, part of the functions of the inference target image acquiring unit 210, the captured inference image acquiring unit 211, the one-dimensional inference target image generating unit 220, the trained model acquiring unit 230, and the inference unit 240 may be implemented by the processor 801 and the memory 802, and the remaining functions may be implemented by the processing circuit 803.

Since the processor 801 and the memory 802 are similar to the processor 401 and the memory 402 illustrated in FIG. 4A, the description thereof will be omitted.

In addition, since the processing circuit 803 is similar to the processing circuit 403 illustrated in FIG. 4B, the description thereof will be omitted.

The operation of the image processing device 200 according to the first embodiment will be described with reference to FIG. 9.

Figures 9, 10:
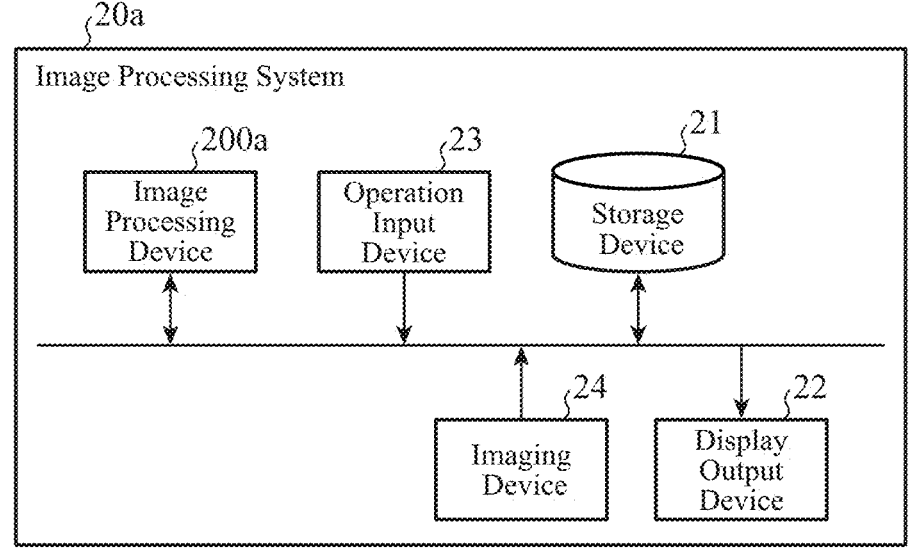
FIG. 9 is a flowchart illustrating an example of processing performed in the image processing device according to the first embodiment.
FIG. 10 is a block diagram illustrating an example of a configuration of a main part of an image processing system to which an image processing device according to a second embodiment is applied.

FIG. 9 is a flowchart illustrating an example of processing performed in the image processing device 200 according to the first embodiment.

Note that FIG. 9 is a flowchart in a case where the image processing device 200 includes the captured inference image acquiring unit 211 and the trained model acquiring unit 230 in addition to the inference target image acquiring unit 210, the one-dimensional inference target image generating unit 220, and the inference unit 240.

In a case where the image processing device 200 does not include the captured inference image acquiring unit 211 or the trained model acquiring unit 230, processing performed by the captured inference image acquiring unit 211 and the trained model acquiring unit 230 can be appropriately omitted in FIG. 9.

First, in step ST901, the captured inference image acquiring unit 211 acquires captured inference image information.

Next, in step ST902, the inference target image acquiring unit 210 acquires inference target image information.

Next, in step ST903, the one-dimensional inference target image generating unit 220 generates a one-dimensional inference target image signal.

Next, in step ST904, the trained model acquiring unit 230 acquires trained model information.

Next, in step ST905, the inference unit 240 acquires an inference result output by the trained model and acquires inference result information based on the inference result.

After step ST905, the image processing device 200 ends the processing of the flowchart, returns to step ST901 after the end, and repeatedly executes the processing of the flowchart.

As described above, the training device 100 according to the first embodiment includes a training image acquiring unit 110 to acquire training image information indicating a training image, a one-dimensional training image generating unit 120 to generate a plurality of one-dimensional training image signals corresponding to a plurality of pieces of the training image information by making the training image indicated by each of the plurality of pieces of the training image information acquired by the training image acquiring unit 110 into one dimension, a matrix generating unit 130 to generate a matrix in which the plurality of the one-dimensional training image signals generated by the one-dimensional training image generating unit 120 is arranged in parallel with each other, a singular value decomposing unit 140 to calculate a right singular vector and a singular value by performing singular value decomposition on the matrix generated by the matrix generating unit 130, a trained model generating unit 150 to generate a trained model that is based on the right singular vector and the singular value calculated by the singular value decomposing unit 140 and outputs an inference result using, as an explanatory variable, a one-dimensional inference target image signal indicating an image obtained by making an inference target image that is an image obtained by image-capturing an inference target object into one dimension, and a trained model output unit 160 to output the trained model generated by the trained model generating unit 150 as trained model information.

With such a configuration, the training device 100 can generate the trained model that enables highly accurate inference in a short time compared to the related art.

Further, as described above, in the training device 100 according to the first embodiment, in the above-described configuration, the trained model generating unit 150 generates the trained model that outputs, as the inference result, a one-dimensional approximate signal that is an approximate signal of the one-dimensional inference target image signal on the basis of the right singular vector and the singular value calculated by the singular value decomposing unit 140 when the one-dimensional inference target image signal is input as the explanatory variable.

With such a configuration, the training device 100 can generate a trained model that enables highly accurate inference in a short time compared to the related art and outputs, as an inference result, the one-dimensional approximate signal based on the inference target image input to the trained model as an explanatory variable.

Further, as described above, in the training device 100 according to the first embodiment, in the above-described configuration, the trained model generating unit 150 is configured to generate, when the one-dimensional inference target image signal is input as the explanatory variable, the trained model generating unit generates the trained model that outputs a feature vector of the inference target image corresponding to the one-dimensional inference target image signal as the inference result on the basis of the right singular vector and the singular value calculated by the singular value decomposing unit 140.

With such a configuration, the training device 100 can generate a trained model that enables highly accurate inference in a short time compared to the related art and outputs, as an inference result, the feature vector of the inference target image corresponding to a one-dimensional inference target image signal input to the trained model as an explanatory variable.

Further, as described above, in the training device 100 according to the first embodiment, in the above-described configuration, the one-dimensional training image generating unit 120 is configured to generate the one-dimensional training image signals by raster scanning the training image indicated by the training image information acquired by the training image acquiring unit 110.

With this configuration, the training device 100 can easily convert the training image into the one-dimensional training image signal.

Further, as described above, in the training device 100 according to the first embodiment, in the above-described configuration, the training image acquiring unit 110 is configured to acquire the training image information indicating each of a plurality of the training images having equal numbers of pixels.

With such a configuration, the training device 100 can easily generate a matrix without performing complicated image processing on a plurality of training images when generating the trained model.

Further, as described above, in addition to the above configuration, the training device 100 according to the first embodiment includes the captured image acquiring unit 111 that acquires captured image information that indicates a captured image acquired by image-capturing a target object and corresponds to each of a plurality of different target objects, and the training image acquiring unit 110 is configured to divide a captured image indicated by each of a plurality of pieces of the captured image information acquired by the captured image acquiring unit 111 into a plurality of image regions, acquire partial image information indicating each of a plurality of partial images based on the captured image for each piece of the captured image information, and thereby acquire a plurality of pieces of the partial image information corresponding to each of the plurality of pieces of the captured image information acquired by the captured image acquiring unit 111 as the training image information.

With such a configuration, the training device 100 can generate the trained model that enables highly accurate inference specialized for the partial image in the predetermined image region in the captured image obtained by image-capturing the inference target object in a short time compared to the related art.

Further, as described above, in the training device 100 according to the first embodiment, in the above-described configuration, the matrix generating unit 130 is configured to generate the matrix by arranging, in parallel with each other, a plurality of the one-dimensional training image signals corresponding to a plurality of pieces of the partial image information satisfying one or more predetermined conditions out of a plurality of pieces of the partial image information that is acquired by the training image acquiring unit 110 and corresponds to each of the plurality of pieces of captured image information acquired by the captured image acquiring unit 111.

With such a configuration, the training device 100 can generate the trained model that enables highly accurate inference specialized for the partial image in the predetermined image region in the captured image obtained by image-capturing the inference target object in a short time compared to the related art.

Further, as described above, in the training device 100 according to the first embodiment, in the above-described configuration, the matrix generating unit 130 is configured to generate a matrix by arranging the one-dimensional training image signals generated by the one-dimensional training image generating unit 120 in parallel with each other on the basis of the partial image information corresponding to the same image region in the captured image indicated by each of the plurality of pieces of captured image information acquired by the captured image acquiring unit 111.

With such a configuration, the training device 100 can generate the trained model that enables highly accurate inference specialized for the partial image in the predetermined image region in the captured image obtained by image-capturing the inference target object in a short time compared to the related art.

Further, as described above, in addition to the above-described configuration, the training device 100 according to the first embodiment includes the clustering unit 112 to cluster the partial images indicated by each of the plurality of pieces of the partial image information corresponding to each of the plurality of pieces of captured image information acquired by the training image acquiring unit 110, the plurality of pieces of partial image information being acquired by the captured image acquiring unit 111, and the matrix generating unit 130 is configured to generate the matrix by arranging the one-dimensional training image signals generated by the one-dimensional training image generating unit 120 in parallel with each other for each of the plurality of the partial images belonging to each class classified on the basis of a result of clustering by the clustering unit 112.

With this configuration, the training device 100 can generate the trained model that enables highly accurate inference specialized for the partial images belonging to each class in the captured image obtained by image-capturing the inference target object in a short time compared to the related art.

Further, as described above, in addition to the above-described configuration, the training device 100 according to the first embodiment is configured so that the matrix generating unit 130 generates, on the basis of the predetermined conditions, the matrix corresponding to each of the conditions, the singular value decomposing unit 140 calculates the right singular vector and the singular value for the matrix for each of the conditions generated by the matrix generating unit 130, and the trained model generating unit 150 generates the trained model corresponding to the matrix for each of the conditions on the basis of the right singular vector and the singular value corresponding to the matrix for each of the conditions generated by the matrix generating unit 130. With this configuration, the training device 100 can generate a plurality of trained models that enable highly accurate inference specialized for a partial image in a predetermined image region or a partial image belonging to each class classified on the basis of a result of clustering by the clustering unit 112 in a captured image obtained by image-capturing an inference target object, the plurality of trained models corresponding to a matrix for each condition in a short time compared to the related art.

Further, as described above, the image processing device 200 according to the first embodiment includes the inference target image acquiring unit 210 to acquire inference target image information indicating an inference target image that is an image based on a captured inference image that is an image obtained by image-capturing an inference target object, the one-dimensional inference target image generating unit 220 to generate a one-dimensional inference target image signal corresponding to the inference target image information by making the inference target image indicated by the inference target image information acquired by the inference target image acquiring unit 210 into one dimension, and the inference unit 240 to acquire inference result information corresponding to the one-dimensional inference target image signal on the basis of the one-dimensional inference target image signal generated by the one-dimensional inference target image generating unit 220, and acquire, by inputting the one-dimensional inference target image signal as an explanatory variable to a trained model and acquiring an inference result output by the trained model, the inference result information based on the inference result.

With this configuration, the image processing device 200 can perform highly accurate inference using the trained model generated in a short time compared to the related art.

Further, as described above, in the image processing device 200 according to the first embodiment, in the above-described configuration, the inference unit 240 is configured to input the one-dimensional inference target image signal to the trained model as the explanatory variable, acquire a one-dimensional approximate signal that is output as the inference result by the trained model and is an approximate signal of the one-dimensional inference target image signal, and acquire, as the inference result information, restored image information indicating a restored image generated from the one-dimensional approximate signal output as the inference result by the trained model.

With such a configuration, the image processing device 200 can acquire the one-dimensional approximate signal approximating the one-dimensional inference target image signal from the one-dimensional inference target image signal based on the inference target image input as the explanatory variable to the trained model using the trained model generated in a short time compared to the related art, and can infer the inference target image with high accuracy using the acquired one-dimensional approximate signal.

Further, as described above, in the image processing device 200 according to the first embodiment, in the above-described configuration, the inference unit 240 is configured to generate the restored image by mapping the one-dimensional approximate signal output as the inference result by the trained model to a two-dimensional image similar in size to the inference target image indicated by the inference target image information acquired by the inference target image acquiring unit 210, and acquire the restored image information indicating the restored image.

With such a configuration, the image processing device 200 can acquire the one-dimensional approximate signal approximating the one-dimensional inference target image signal from the one-dimensional inference target image signal based on the inference target image input as the explanatory variable to the trained model using the trained model generated in a short time compared to the related art, and can infer the inference target image with high accuracy using the acquired one-dimensional approximate signal.

Further, as described above, in the image processing device 200 according to the first embodiment, in the above-described configuration, the inference unit 240 is configured to input the one-dimensional inference target image signal to the trained model as the explanatory variable, acquire a feature vector that is output as the inference result by the trained model and is of the inference target image corresponding to the one-dimensional inference target image signal, and acquire, as the inference result information, feature vector information indicating the feature vector output as the inference result by the trained model.

With such a configuration, the image processing device 200 can infer the feature vector of the inference target image corresponding to the one-dimensional inference target image signal input to the trained model as the explanatory variable with high accuracy using the trained model generated in a short time compared to the related art.

Further, as described above, in the image processing device 200 according to the first embodiment, in the above-described configuration, the one-dimensional inference target image generating unit 220 is configured to generate the one-dimensional inference target image signal by raster scanning the inference target image indicated by the inference target image information acquired by the inference target image acquiring unit 210.

With this configuration, the image processing device 200 can easily convert the inference target image into the one-dimensional inference target image signal.

Further, as described above, in addition to the above-described configuration, the image processing device 200 according to the first embodiment includes the captured inference image acquiring unit 211 to acquire captured inference image information indicating a captured inference image obtained by image-capturing an inference target object, in which the inference target image acquiring unit 210 divides the captured inference image into a plurality of image regions with respect to the captured inference image indicated by the captured inference image information acquired by the captured inference image acquiring unit 211, and acquires partial inference image information indicating each of a plurality of partial inference images based on the captured inference image, to thereby acquire each of one or more predetermined pieces of the partial inference image information out of a plurality of pieces of the partial inference image information corresponding to the captured inference image information acquired by the captured inference image acquiring unit 211 as the inference target image information, and the one-dimensional inference target image generating unit 220 generates the one-dimensional inference target image signal corresponding to each of one or more pieces of the inference target image information acquired by the inference target image acquiring unit 210, and the inference unit 240 acquires the inference result information corresponding to the one-dimensional inference target image signal that is generated by the one-dimensional inference target image generating unit 220 and corresponds to each of one or more pieces of the inference target image information.

With this configuration, the image processing device 200 can perform highly accurate inference specialized for a partial image in a predetermined image region of the captured inference image obtained by image-capturing the inference target object.

Second Embodiment

An image processing device 200a according to a second embodiment will be described with reference to FIGS. 10 to 13.

A configuration of a main part of an image processing system 20a to which the image processing device 200a according to the second embodiment is applied will be described with reference to FIG. 10.

FIG. 10 is a block diagram illustrating an example of a configuration of the main part of the image processing system 20a to which the image processing device 200a according to the second embodiment is applied.

The image processing system 20a includes the storage device 21, the display output device 22, the operation input device 23, the imaging device 24, and the image processing device 200a.

That is, the image processing system 20a is obtained by changing the image processing device 200 according to the first embodiment to the image processing device 200a.

In FIG. 10, components similar to the components illustrated in FIG. 6 are denoted by the same reference numerals, and detailed description thereof is omitted. That is, detailed description of the storage device 21, the display output device 22, the operation input device 23, and the imaging device 24 is omitted.

The image processing device 200a has a function included in the image processing device 200 according to the first embodiment, and additionally has a function of determining whether or not there is an abnormality in an inference target object appearing in an inference target image. Here, the abnormality indicates a feature that is not present in a normal inference target object (non-defective product). Examples of the abnormality include a scratch, dirt, discoloration, foreign matter adhesion, damage, a defect, a component error, and a printing error in the case of product inspection.

A configuration of a main part of the image processing device 200a according to the second embodiment will be described with reference to FIG. 11.

Figure 11:
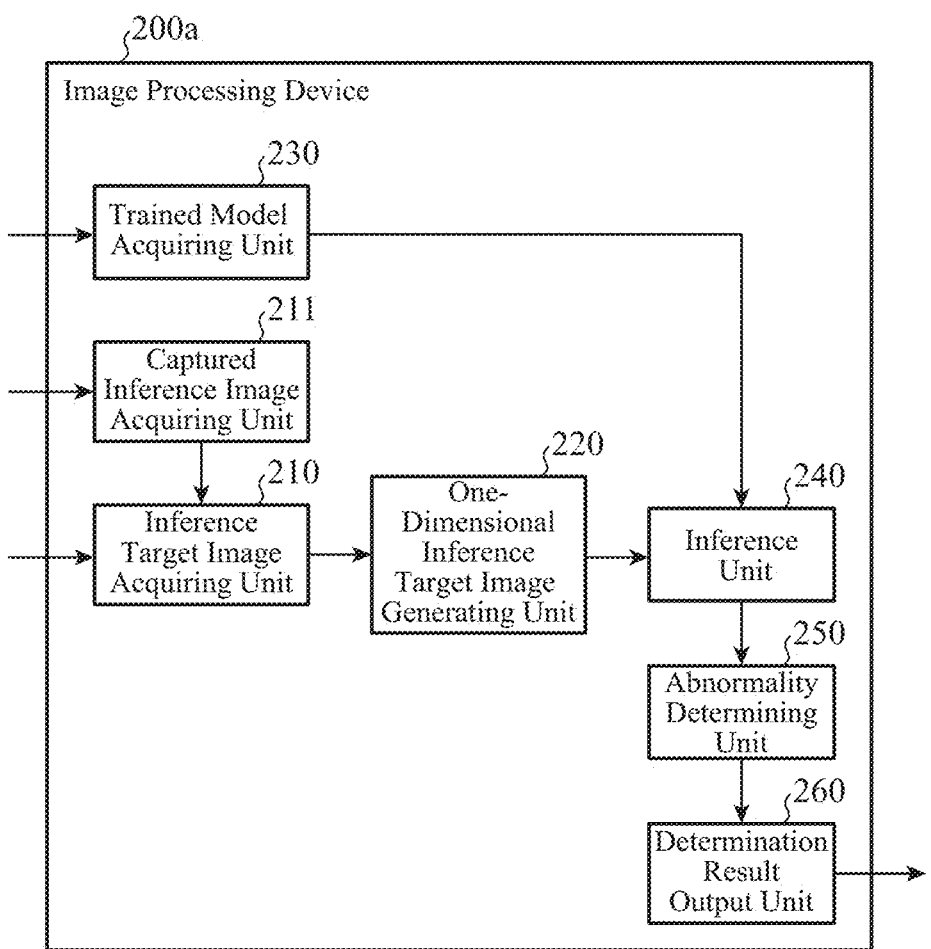
FIG. 11 is a block diagram illustrating an example of a configuration of a main part of the image processing device according to the second embodiment.

FIG. 11 is a block diagram illustrating an example of the configuration of the main part of the image processing device 200a according to the second embodiment.

The image processing device 200a includes the inference target image acquiring unit 210, the captured inference image acquiring unit 211, the one-dimensional inference target image generating unit 220, the trained model acquiring unit 230, the inference unit 240, an abnormality determining unit 250, and a determination result output unit 260.

That is, the image processing device 200a is obtained by adding the abnormality determining unit 250 and the determination result output unit 260 to the image processing device 200 according to the first embodiment.

In FIG. 11, components similar to the components illustrated in FIG. 7 are denoted by the same reference numerals, and detailed description thereof is omitted. That is, detailed description of the captured inference image acquiring unit 211, the one-dimensional inference target image generating unit 220, the trained model acquiring unit 230, and the inference unit 240 included in the image processing device 200a will be omitted.

Note that the trained model used by the inference unit 240 included in the image processing device 200a according to the second embodiment is a trained model that is generated by the training device 100 according to the first embodiment, and outputs, as an inference result, a one-dimensional approximate signal that is an approximate signal of a one-dimensional inference target image signal input as an explanatory variable. Furthermore, the trained model is a model trained using a plurality of one-dimensional training image signals corresponding to a plurality of respective training images indicating a captured image in which an imaging target object without abnormality (hereinafter referred to as a "non-defective product image") is captured.

That is, the inference unit 240 included in the image processing device 200a according to the second embodiment inputs the one-dimensional inference target image signal to the trained model as the explanatory variable, acquires a one-dimensional approximate signal that is output as the inference result by the trained model and is an approximate signal of the one-dimensional inference target image signal, and acquires, as the inference result information, restored image information indicating a restored image generated from the one-dimensional approximate signal output as the inference result by the trained model. In this embodiment, since the restored image is inferred using the trained model trained from only the plurality of non-defective product images, only features of the non-defective product image can be accurately restored.

On the basis of the inference target image information acquired by the inference target image acquiring unit 210 and the restored image information generated by the inference unit 240, the abnormality determining unit 250 determines whether or not there is an abnormality in the inference target object appearing in the inference target image by comparing the inference target image indicated by the inference target image information with the restored image indicated by the restored image information.

Specifically, for example, the abnormality determining unit 250 divides each of the inference target image indicated by the inference target image information and the restored image indicated by the restored image information into a plurality of inspection blocks having a predetermined image size.

Hereinafter, the inspection blocks obtained by dividing the inference target image will be referred to as inspection target blocks, and the inspection blocks obtained by dividing the restored image will be referred to as restoration inspection blocks.

Here, since the inference target image and the restored image are images of the same image size and are divided in the same manner, the number of inspection target blocks and the number of restoration inspection blocks are equal. Hereinafter, it is assumed that the number of inspection target blocks and the number of restoration inspection blocks are both j (j is a positive integer). In addition, the inspection blocks and the restoration inspection blocks can be generated by dividing in such a manner that the blocks are adjacent to each other or the blocks overlap each other in such a way that $S_x \leq B_x$ and $S_y \leq B_y$ in FIG. 3B exemplified as the description of the divided image. In this manner, for each abnormal region, it is possible to increase the probability that one or more inspection blocks in which the abnormal region (scratches, foreign matters, or the like) is within the block are present. That is, it is possible to reduce the probability that an abnormal region is divided into a plurality of blocks due to that the abnormal region crosses a boundary of the blocks, which reduces the abnormality score of each block, and thus the detection omission occurs.

Figure 12:
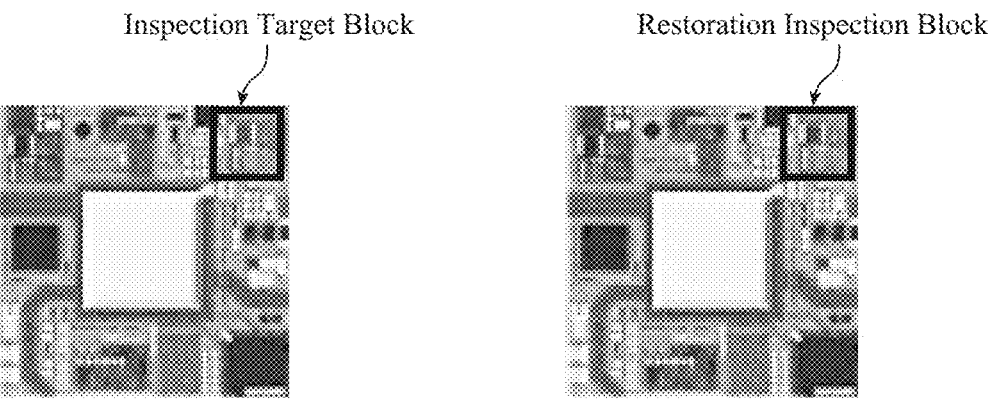
FIG. 12 is an explanatory diagram illustrating an example of an inspection target block in an inference target image and a restoration inspection block in a restored image which are to be compared by an abnormality determining unit included in an image processing device according to the second embodiment.

With reference to FIG. 12, the restoration inspection block in the inference target image and the restoration inspection block in the restored image which are to be compared by the abnormality determining unit 250 included in the image processing device 200a according to the second embodiment will be described.

FIG. 12 is an explanatory diagram illustrating an example of an inspection target block in the inference target image and a restoration inspection block in the restored image which are to be compared by the abnormality determining unit 250 included in the image processing device 200a according to the second embodiment.

In FIG. 12, an image illustrated on the left side is the inference target image, and an image of an image region surrounded by a solid line rectangle in the inference target image is one of the inspection target blocks. In addition, in FIG. 12, an image illustrated on the right side is the restored image, and an image of an image region surrounded by a solid line rectangle in the restored image is the restoration inspection block corresponding to the inspection target block.

For each of the j inspection target blocks, the abnormality determining unit 250 compares the inspection target block with the restoration inspection block corresponding to the same image region as the inspection target block in the inference target image in the restored image to determine whether or not there is an abnormality in the inference target object appearing in the inference target image. As described above, since the restored image is inferred using the trained model trained from only the plurality of non-defective product images, only features of the non-defective product image can be accurately restored. On the other hand, the restoration accuracy becomes low for an abnormal portion having a feature that does not exist in the non-defective product. Therefore, it is possible to determine that a region having a large difference between the inspection target block and the restoration inspection block is abnormal.

More specifically, for example, the abnormality determining unit 250 calculates a difference evaluation value between a k-th (k is any positive integer equal to or less than j) inspection target block and a k-th restoration inspection block corresponding to the inspection target block using the following Expression (9).

$$\alpha_k = \sum_{x=1}^{n_k} \left| \left( S_{R_k}(x) - E_{R_k} \right) - \left( S_{G_k}(x) - E_{G_k} \right) \right| \qquad \text{Expression (9)}$$

Here, $\alpha_k$ is the difference evaluation value between the k-th inspection target block and the k-th restoration inspection block corresponding to the inspection target block. Further, $R_k$ is a set of pixels (hereinafter referred to as a "pixel set") in the k-th inspection target block, $G_k$ is a set of pixels in the k-th restoration inspection block, and $n_k$ is the number of pixels of $R_k$ and $G_k$.

Further, $S_X(x)$ is a signal value of a pixel x in a pixel set X (x=1, 2, . . . , n, and n is the number of pixels of the pixel set X), and $E_X$ is an average value of the signal values in the pixel set X.

Note that, in Expression (9), an absolute value difference sum of values obtained by subtracting the average value $E_X$ (x=$R_k$, $G_k$) from each of the pixel sets $R_k$ and $G_k$ is obtained. In this manner, the difference evaluation value focusing only on a difference in texture rather than a difference in signal values themselves of the pixel sets $R_k$ and $G_k$ is indicated. Thus, it is possible to perform the evaluation that does not affect variation in the average value such as brightness of the entire screen of the inference target image due to image-capturing condition variation, which exceeds the range of variation of the plurality of training images used for training. On the other hand, in a case where it is desired to perform evaluation as abnormality including such variation in the average value, it is sufficient if an expression obtained by deleting $E_X$ (x=$R_k$, $G_k$) in Expression (9) is defined as $\alpha_k$.

Further, for example, the abnormality determining unit 250 calculates an inspection score I which is a maximum value of difference evaluation values corresponding to the respective j inspection target blocks using the following Expression (10).

$$I = \max_{k=0, 1, \cdots, j} (\alpha_k - \alpha\_base_k) \qquad \text{Expression (10)}$$

Here, $\alpha\_base_k$ is a predetermined value and is a maximum value of the difference evaluation value (for example, the difference evaluation value calculated by Expression (9)) between the inspection target block in the non-defective product image and the restoration inspection block in the non-defective product restored image, which are calculated on the basis of the non-defective product image and the restored image (hereinafter referred to as a "non-defective product restored image") generated by the inference unit 240 on the basis of the non-defective product image, for the non-defective product image prepared in advance.

That is, in a case where $\alpha\_base_k$ is a value that covers variation of the non-defective product image that can occur on the basis of the non-defective product image prepared in advance, $\alpha\_base_k$ indicates the maximum abnormality degree that occurs on the basis of the non-defective product image.

Therefore, for example, in a case where the value of the inspection score I calculated by Expression (10) exceeds 0 (zero), the abnormality determining unit 250 determines whether or not there is an abnormality in the inference target object appearing in the inference target image.

Note that a threshold value for the abnormality determining unit 250 to determine whether or not there is an abnormality in the inference target object appearing in the inference target image based on the inspection score I calculated by Expression (10) is not limited to 0 (zero). The threshold value may be a value larger than 0 (zero) or a value smaller than 0 (zero). As the threshold value is larger, it is less likely to be determined as abnormal, and thus the probability of occurrence of overdetection (overdetection rate) is suppressed, while the probability of occurrence of overlooking of abnormality (overlooking rate) increases. Since the over-detection rate and the overlooking rate are in a trade-off relationship, the threshold value is a tuning parameter in the image processing device.

The determination result output unit 260 outputs a result determined by the abnormality determining unit 250 as determination result information.

Specifically, for example, the determination result output unit 260 may output the determination result information to the display output device 22 as a display image signal, and cause the display output device 22 to display the determination result information.

Furthermore, for example, the determination result output unit 260 may output to an output device, which is not illustrated in FIG. 10, such as a determination result information illuminating device or a voice output device, and in a case where it is determined that there is an abnormality in the inference target object, the output device may be caused to display the fact that the abnormality is present.

Note that the functions of the inference target image acquiring unit 210, the captured inference image acquiring unit 211, the one-dimensional inference target image generating unit 220, the trained model acquiring unit 230, the inference unit 240, the abnormality determining unit 250, and the determination result output unit 260 in the image processing device 200a according to the second embodiment may be implemented by the processor 801 and the memory 802 in the hardware configuration illustrated as an example in FIGS. 8A and 8B in the first embodiment, or may be implemented by the processing circuit 803.

The operation of the image processing device 200a according to the second embodiment will be described with reference to FIG. 13.

Figure 13:
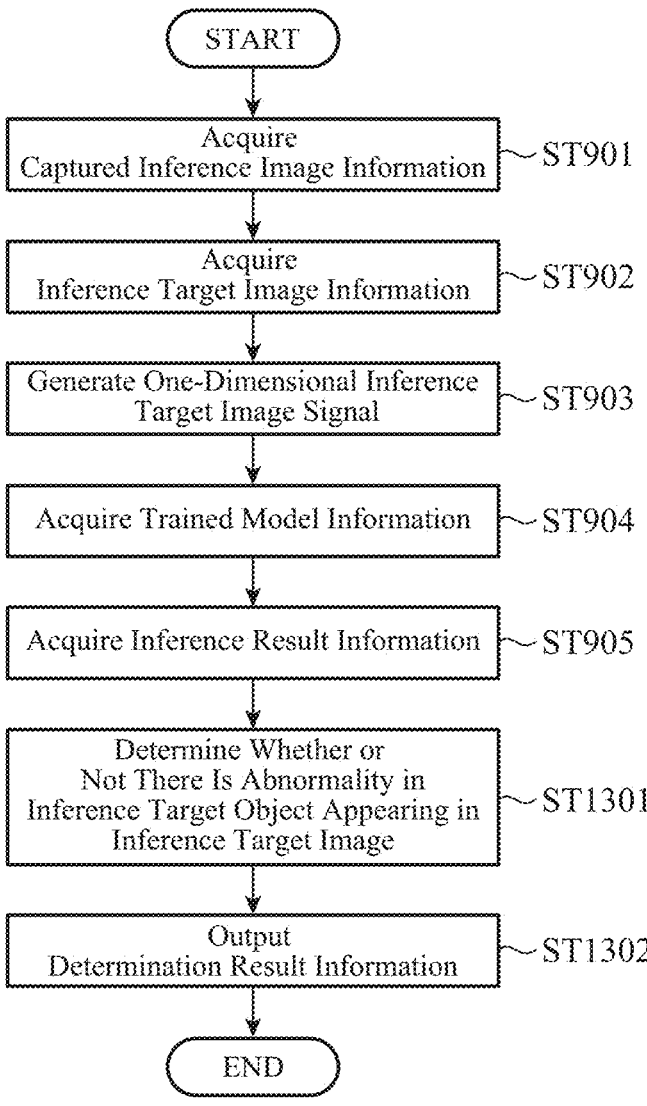
FIG. 13 is a flowchart illustrating an example of processing performed in the image processing device according to the second embodiment.

FIG. 13 is a flowchart illustrating an example of processing performed in the image processing device 200a according to the second embodiment.

Note that, in FIG. 13, the processing from step ST901 to step ST905 is similar to the processing from step ST901 to step ST905 illustrated in FIG. 9.

First, in step ST901, the captured inference image acquiring unit 211 acquires the captured inference image information.

Next, in step ST902, the inference target image acquiring unit 210 acquires the inference target image information.

Next, in step ST903, the one-dimensional inference target image generating unit 220 generates the one-dimensional inference target image signal.

Next, in step ST904, the trained model acquiring unit 230 acquires the trained model information.

Next, in step ST905, the inference unit 240 acquires an inference result output by the trained model and acquires the inference result information based on the inference result.

Next, in step ST1301, the abnormality determining unit 250 determines whether or not there is an abnormality in the inference target object appearing in the inference target image.

Next, in step ST1302, the determination result output unit 260 outputs the determination result information.

After step ST1302, the image processing device 200a ends the processing of the flowchart, returns to step ST901 after the end, and repeatedly executes the processing of the flowchart.

As described above, the image processing device 200a according to the second embodiment includes an inference target image acquiring unit 210 to acquire inference target image information indicating an inference target image that is an image based on a captured inference image that is an image obtained by image-capturing an inference target object, a one-dimensional inference target image generating unit 220 to generate a one-dimensional inference target image signal corresponding to the inference target image information by making the inference target image indicated by the inference target image information acquired by the inference target image acquiring unit 210 into one dimension, and an inference unit 240 to acquire inference result information corresponding to the one-dimensional inference target image signal on the basis of the one-dimensional inference target image signal generated by the one-dimensional inference target image generating unit 220, and acquire, by inputting the one-dimensional inference target image signal as an explanatory variable to a trained model and acquiring an inference result output by the trained model, the inference result information based on the inference result, in which the inference unit 240 included in the image processing device 200a inputs the one-dimensional inference target image signal to the trained model as an explanatory variable, acquires a one-dimensional approximate signal that is output as the inference result by the trained model and is an approximate signal of the one-dimensional inference target image signal, and acquires, as the inference result information, restored image information indicating a restored image generated from the one-dimensional approximate signal output as the inference result by the trained model, and the image processing device 200a further includes an abnormality determining unit 250 to determine whether or not there is an abnormality in the inference target object appearing in the inference target image by comparing the inference target image indicated by the inference target image information with the restored image indicated by the restored image information on the basis of the inference target image information acquired by the inference target image acquiring unit 210 and the restored image information generated by the inference unit 240, and a determination result output unit 260 to output a result determined by the abnormality determining unit 250 as determination result information.

With such a configuration, the image processing device 200a can acquire the one-dimensional approximate signal approximating the one-dimensional inference target image signal from the one-dimensional inference target image signal based on the inference target image input as the explanatory variable to the trained model using the trained model generated in a short time compared to the related art, can infer the restored image obtained by restoring the inference target image with high accuracy using the acquired one-dimensional approximate signal, and can determine whether or not there is an abnormality in the inference target object appearing in the inference target image by comparing the restored image and the inference target image.

Third Embodiment

An image processing device 200b according to a third embodiment will be described with reference to FIGS. 14 to 16.

A configuration of a main part of an image processing system 20b to which the image processing device 200b according to the third embodiment is applied will be described with reference to FIG. 14.

Figure 14:
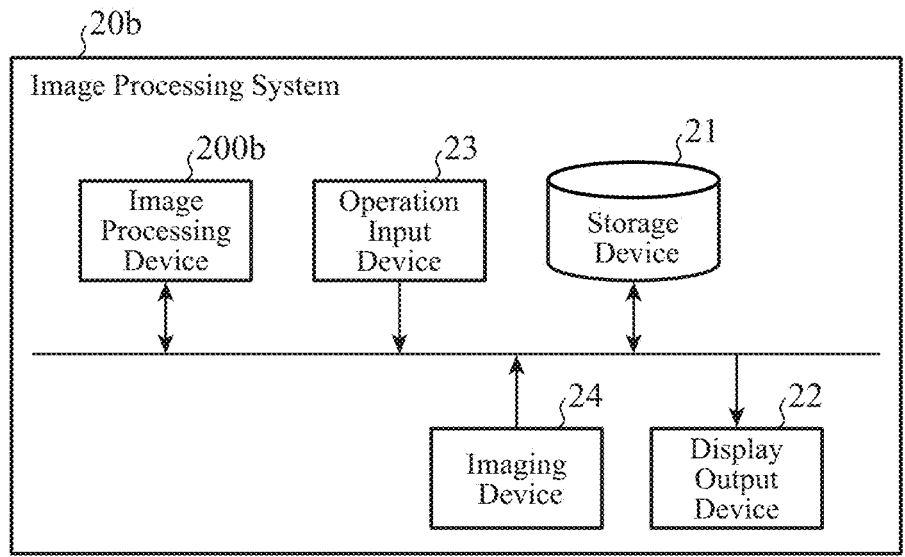
FIG. 14 is a block diagram illustrating an example of a configuration of a main part of an image processing system to which an image processing device according to a third embodiment is applied.

FIG. 14 is a block diagram illustrating an example of a configuration of the main part of the image processing system 20b to which the image processing device 200b according to the third embodiment is applied.

The image processing system 20b includes the storage device 21, the display output device 22, the operation input device 23, the imaging device 24, and the image processing device 200b.

That is, the image processing system 20b is obtained by changing the image processing device 200 according to the first embodiment to the image processing device 200b.

In FIG. 14, components similar to the components illustrated in FIG. 6 are denoted by the same reference numerals, and detailed description thereof is omitted. That is, detailed description of the storage device 21, the display output device 22, the operation input device 23, and the imaging device 24 is omitted.

The image processing device 200b includes the function of the image processing device 200 according to the first embodiment, and additionally includes a function of classifying inference target image information into any one of a plurality of predetermined groups.

A configuration of a main part of the image processing device 200b according to the third embodiment will be described with reference to FIG. 15.

Figure 15:
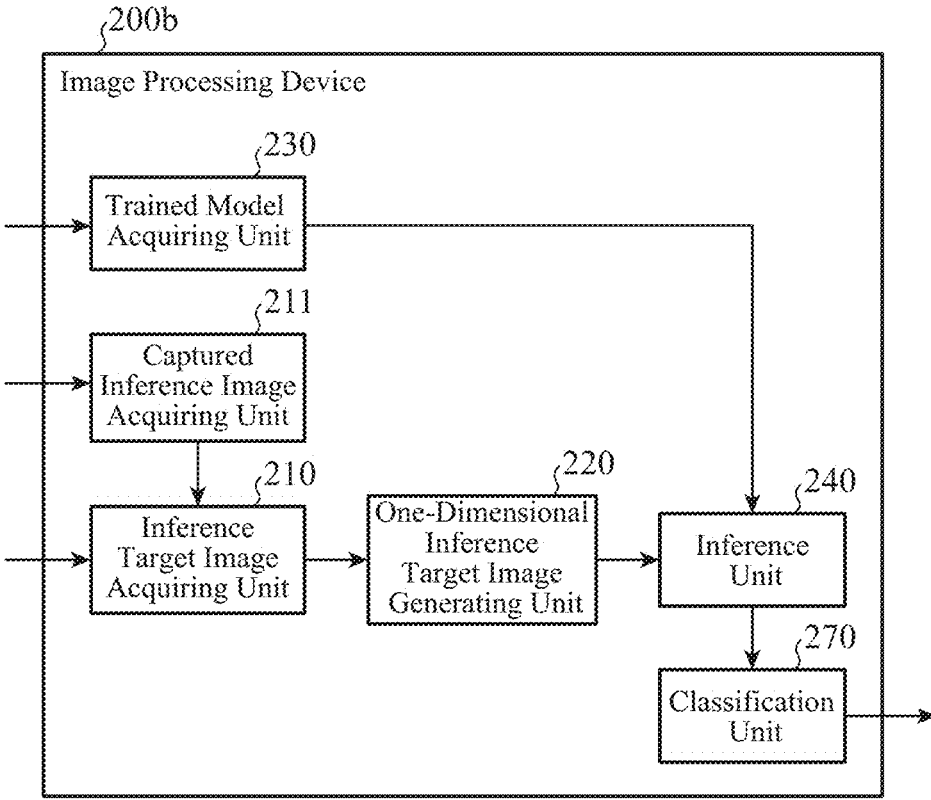
FIG. 15 is a block diagram illustrating an example of a configuration of a main part of the image processing device according to the third embodiment.

FIG. 15 is a block diagram illustrating an example of the configuration of the main part of the image processing device 200b according to the third embodiment.

The image processing device 200b includes the inference target image acquiring unit 210, the captured inference image acquiring unit 211, the one-dimensional inference target image generating unit 220, the trained model acquiring unit 230, the inference unit 240, and a classification unit 270.

That is, the image processing device 200b is obtained by adding the classification unit 270 to the image processing device 200 according to the first embodiment.

In FIG. 15, components similar to the components illustrated in FIG. 7 are denoted by the same reference numerals, and detailed description thereof is omitted. That is, detailed description of the captured inference image acquiring unit 211, the one-dimensional inference target image generating unit 220, the trained model acquiring unit 230, and the inference unit 240 included in the image processing device 200b will be omitted.

Note that the trained model used by the inference unit 240 included in the image processing device 200b according to the third embodiment is a trained model that is generated by the training device 100 according to the first embodiment, and outputs, as an inference result, a feature vector of an inference target image corresponding to a one-dimensional inference target image signal input as an explanatory variable.

That is, the inference unit 240 included in the image processing device 200b according to the third embodiment inputs the one-dimensional inference target image signal to the trained model as the explanatory variable, acquires a feature vector that is output as the inference result by the trained model and is of the inference target image corresponding to the one-dimensional inference target image signal, and acquires, as the inference result information, feature vector information indicating the feature vector output as the inference result by the trained model.

The classification unit 270 classifies the inference target image information corresponding to the feature vector information into any of a plurality of predetermined groups on the basis of the feature vector information acquired by the inference unit 240, and outputs classification result information indicating a classification result.

Specifically, for example, the classification unit 270 classifies the inference target image information into any one of a plurality of predetermined groups by performing classification based on supervised training such as a support vector machine (SVM) using the feature vector information acquired by the inference unit 240.

A classification method based on supervised training such as a support vector machine will not be described because it is a well-known technique.

Note that the functions of the inference target image acquiring unit 210, the captured inference image acquiring unit 211, the one-dimensional inference target image generating unit 220, the trained model acquiring unit 230, the inference unit 240, and the classification unit 270 in the image processing device 200b according to the third embodiment may be implemented by the processor 801 and the memory 802 in the hardware configuration illustrated as an example in FIGS. 8A and 8B in the first embodiment, or may be implemented by the processing circuit 803.

The operation of the image processing device 200b according to the second embodiment will be described with reference to FIG. 16. FIG. 16 is a flowchart illustrating an example of processing performed in the image processing device 200b according to the second embodiment.

Figure 16:
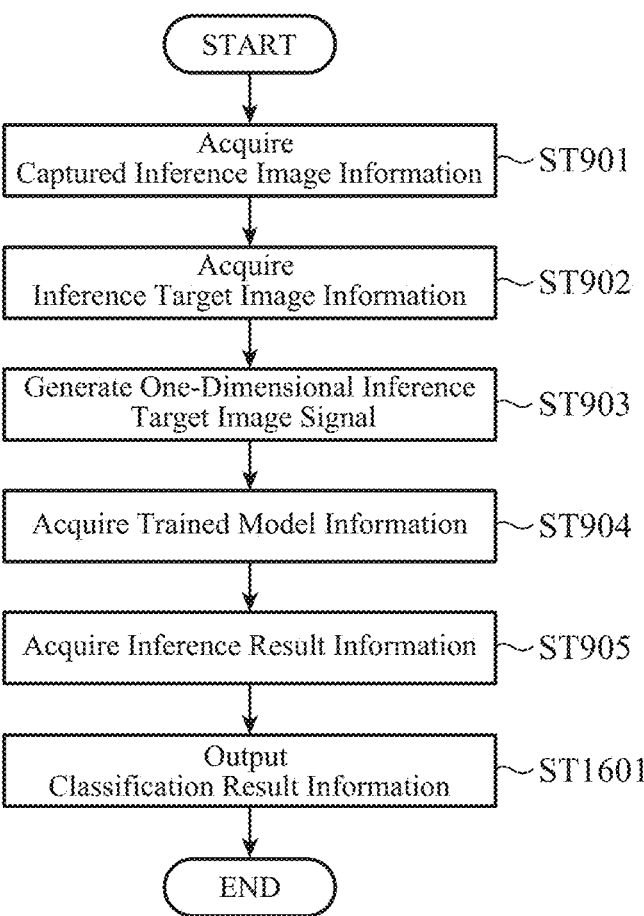
FIG. 16 is a flowchart illustrating an example of processing performed in the image processing device according to the third embodiment.

Note that, in FIG. 16, the processing from step ST901 to step ST905 is similar to the processing from step ST901 to step ST905 illustrated in FIG. 9.

First, in step ST901, the captured inference image acquiring unit 211 acquires captured inference image information.

Next, in step ST902, the inference target image acquiring unit 210 acquires the inference target image information.

Next, in step ST903, the one-dimensional inference target image generating unit 220 generates the one-dimensional inference target image signal.

Next, in step ST904, the trained model acquiring unit 230 acquires trained model information.

Next, in step ST905, the inference unit 240 acquires an inference result output by the trained model and acquires the inference result information based on the inference result.

Next, in step ST1601, the classification unit 270 outputs classification result information.

After step ST1601, the image processing device 200b ends the processing of the flowchart, returns to step ST901 after the end, and repeatedly executes the processing of the flowchart.

As described above, the image processing device 200b according to the second embodiment includes an inference target image acquiring unit 210 to acquire inference target image information indicating an inference target image that is an image based on a captured inference image that is an image obtained by image-capturing an inference target object, a one-dimensional inference target image generating unit 220 to generate a one-dimensional inference target image signal corresponding to the inference target image information by making the inference target image indicated by the inference target image information acquired by the inference target image acquiring unit 210 into one dimension, and an inference unit 240 to acquire inference result information corresponding to the one-dimensional inference target image signal on the basis of the one-dimensional inference target image signal generated by the one-dimensional inference target image generating unit 220, and acquire, by inputting the one-dimensional inference target image signal as an explanatory variable to a trained model and acquiring an inference result output by the trained model, the inference result information based on the inference result, the inference unit 240 inputs the one-dimensional inference target image signal to the trained model as the explanatory variable, acquires a feature vector that is output as the inference result by the trained model and is of the inference target image corresponding to the one-dimensional inference target image signal, and acquires, as the inference result information, feature vector information indicating the feature vector output as the inference result by the trained model, the image processing device 200b further includes a classification unit 270 to classify the inference target image information corresponding to the feature vector information into any of a plurality of predetermined groups on the basis of the feature vector information acquired by the inference unit 240, and output classification result information indicating a classification result.

With this configuration, the image processing device 200b can classify the inference target image information corresponding to the feature vector information into any of a plurality of predetermined groups by using the feature vector of the inference target image corresponding to the one-dimensional inference target image signal input to the trained model as the explanatory variable using the trained model generated in a short time compared to the related art.

Note that, in the present disclosure, it is possible to modify any component of the embodiments or omit any component in the embodiments within the scope of the disclosure.

INDUSTRIAL APPLICABILITY

A training device according to the present disclosure can be applied to a training system.

REFERENCE SIGNS LIST

10: training system, 11: storage device, 12: display output device, 13: operation input device, 100: training device, 110: training image acquiring unit, 111: captured image acquiring unit, 112: clustering unit, 120: one-dimensional training image generating unit, 130: matrix generating unit, 140: singular value decomposing unit, 150: trained model generating unit, 160: trained model output unit, 20, 20a, 20b: image processing system, 21: storage device, 22: display output device, 23: operation input device, 24: imaging device, 200, 200a, 200b: image processing device, 210: inference target image acquiring unit, 211: captured inference image acquiring unit, 220: one-dimensional inference target image generating unit, 230: trained model acquiring unit, 240: inference unit, 250: abnormality determining unit, 260: determination result output unit, 270: classification unit, 401, 801: processor, 402, 802: memory, 403, 803: processing circuit

The invention claimed is:

1. A training device, comprising processing circuitry;
to acquire a plurality of pieces of training image information each indicating a training image;
to generate a plurality of one-dimensional training image signals respectively corresponding to the plurality of pieces of training image information by making the training image indicated by each of the plurality of pieces of training image information into one dimension;
to generate a matrix in which the plurality of one-dimensional training image signals is arranged in parallel with each other;
to calculate a right singular vector and a singular value by performing singular value decomposition on the matrix;
to generate a trained model that is based on the right singular vector and the singular value and outputs an inference result using, as an explanatory variable, a one-dimensional inference target image signal indicating an image obtained by making an inference target image that is an image obtained by image-capturing an inference target object into one dimension; and to output the trained model as trained model information.

2. The training device according to claim 1, wherein the processing circuitry generates the trained model that outputs, as the inference result, a one-dimensional approximate signal that is an approximate signal of the one-dimensional inference target image signal on a basis of the right singular vector and the singular value when the one-dimensional inference target image signal is input as the explanatory variable.

3. The training device according to claim 1, wherein when the one-dimensional inference target image signal is input as the explanatory variable, the processing circuitry generates the trained model that outputs a feature vector of the inference target image corresponding to the one-dimensional inference target image signal as the inference result on a basis of the right singular vector and the singular value.

4. The training device according to claim 1, wherein in a case where a left singular vector which is calculated by performing singular value decomposition on the matrix, the right singular vector, and the singular value are already obtained, as a method of singular value decomposition of a matrix obtained by connecting, in a row direction, the matrix which is subjected to singular value decomposition to obtain the left singular vector, the right singular vector, and the singular value and the matrix, the processing circuitry calculates the right singular vector and the singular value by performing a matrix operation of updating the left singular vector that is already obtained, the right singular vector that is already obtained, and the singular value that is already obtained using the matrix.

5. The training device according to claim 1, wherein in a case where a left singular vector which is calculated by performing singular value decomposition on the matrix, the right singular vector, and the singular value are already obtained, the processing circuitry selects one one-dimensional training image signal from the matrix which is subjected to the singular value decomposition to obtain the left singular vector, the right singular vector, and the singular value, and generates a matrix excluding the one-dimensional training image signal selected from the matrix which is subjected to the singular value decomposition; and as a method of obtaining a singular value decomposition result of the matrix excluding the one-dimensional training image signal selected, the processing circuitry calculates the right singular vector and the singular value by performing a matrix operation of updating the left singular vector that is already obtained, the right singular vector that is already obtained, and the singular value that is already obtained using the one-dimensional training image signal selected.

6. The training device according to claim 1, wherein the processing circuitry generates the one-dimensional training image signals by raster scanning the training image indicated by the training image information.

7. The training device according to claim 1, wherein the processing circuitry acquires the plurality of pieces of training image information respectively indicating a plurality of training images having equal numbers of pixels.

8. The training device according to claim 1, wherein the processing circuitry acquires, as the training image information, a plurality of pieces of partial image information respectively indicating a plurality of partial images obtained by dividing a captured image in which a target object is captured.

9. The training device according to claim 8, wherein the processing circuitry generates the matrix by arranging, in parallel with each other, the plurality of one-dimensional training image signals respectively corresponding to pieces of partial image information, out of the plurality of pieces of partial image information, the pieces of partial image information respectively satisfying predetermined conditions.

10. The training device according to claim 9, wherein the processing circuitry generates the matrix by arranging, in parallel with each other, the one-dimensional training image signals on a basis of the plurality of pieces of partial image information corresponding to a same image region in the captured image.

11. The training device according to claim 9, wherein the processing circuitry further performs:

clustering of the plurality of partial images respectively indicated by the plurality of pieces of partial image information; and generating the matrix by arranging the plurality of one-dimensional training image signals in parallel with each other for each of the plurality of partial images belonging to each class classified on a basis of a result of the clustering.

12. The training device according to claim 9, wherein the processing circuitry generates, on a basis of the predetermined conditions, the matrix corresponding to each of the predetermined conditions, calculates the right singular vector and the singular value for the matrix corresponding to each of the conditions, and generates the trained model corresponding to the matrix which corresponds to each of the conditions on a basis of the right singular vector and the singular value corresponding to the matrix which corresponds to each of the conditions.

13. A training method, comprising:

acquiring a plurality of pieces of training image information each indicating a training image;

generating a plurality of one-dimensional training image signals respectively corresponding to the plurality of pieces of training image information by making the training image indicated by each of the plurality of pieces of training image information into one dimension;

generating a matrix in which the plurality of one-dimensional training image signals is arranged in parallel with each other;

calculating a right singular vector and a singular value by performing singular value decomposition on the matrix;

generating a trained model that is based on the right singular vector and the singular value and outputs an inference result using, as an explanatory variable, a one-dimensional inference target image signal indicating an image obtained by making an inference target image that is an image obtained by image-capturing an inference target object into one dimension; and outputting the trained model as trained model information.

* * * * *